(12) United States Patent
Yeddala et al.

(10) Patent No.: US 11,665,610 B2
(45) Date of Patent: *May 30, 2023

(54) APPARATUS AND METHOD FOR WIRELESS NETWORK EXTENSIBILITY AND ENHANCEMENT

(71) Applicant: Time Warner Cable Enterprises LLC, St. Louis, MO (US)

(72) Inventors: Kiran Yeddala, Ashburn, VA (US); Don Gunasekara, Reston, VA (US)

(73) Assignee: TIME WARNER CABLE ENTERPRISES LLC, St. Louis, MO (US)

( * ) Notice: Subject to any disclaimer, the term of this patent is extended or adjusted under 35 U.S.C. 154(b) by 75 days.

This patent is subject to a terminal disclaimer.

(21) Appl. No.: 17/202,184

(22) Filed: Mar. 15, 2021

(65) Prior Publication Data

US 2021/0227440 A1     Jul. 22, 2021

Related U.S. Application Data

(60) Continuation of application No. 16/443,718, filed on Jun. 17, 2019, now Pat. No. 10,952,118, which is a
(Continued)

(51) Int. Cl.
*H04W 4/00*     (2018.01)
*H04W 36/30*     (2009.01)
(Continued)

(52) U.S. Cl.
CPC ............ *H04W 36/30* (2013.01); *H04W 36/03* (2018.08); *H04W 84/12* (2013.01); *H04W 88/04* (2013.01)

(58) Field of Classification Search
CPC .............................. H04W 36/30; H04W 36/03
See application file for complete search history.

(56) References Cited

U.S. PATENT DOCUMENTS 6,711,148 B1    3/2004   Hills
7,453,844 B1    11/2008   Lee et al.
(Continued)

OTHER PUBLICATIONS

Deering, S., et al., "Internet Protocol, Version 6 (IPv6) Specification", Internet Engineering Task Force (IETF) RFC 2460, Dec. 1998, 39 pages.
(Continued)

*Primary Examiner* — Justin Y Lee
(74) *Attorney, Agent, or Firm* — Patent Beach PC

(57) ABSTRACT

Apparatus and methods for extending and enhancing wireless networks. An exemplary wireless network configured according to the disclosure uses in-service Wireless Network Clients (WNCs), such as mobile phones, laptops, etc., to extend and enhance the wireless network coverage via peer-to-peer sub-networks. In one implementation, each WNC is configured to operate as a Service Access Node (SAN) to other wireless client devices in the same network. The SAN provides peer-to-peer communications capabilities (to communicate with wireless clients) and gateway functionality (to aggregate data traffic over its own uplink communications), thereby enabling wireless clients to "piggyback" their data link onto the WNC. Peer Control Manager (PCM) software on each WNC enables, disables, and controls the service functions for that WNC in accordance with an overarching Peer Controller (PC) entity operated by an Access Point Controller/Core Network.

20 Claims, 16 Drawing Sheets

Related U.S. Application Data division of application No. 14/959,948, filed on Dec. 4, 2015, now Pat. No. 10,327,187.

(51) Int. Cl.
  *H04W 88/04* (2009.01)
  *H04W 84/12* (2009.01)
  *H04W 36/00* (2009.01)

(56) References Cited

U.S. PATENT DOCUMENTS

| | | |
|---|---|---|
| 7,477,621 B1 | 1/2009 | Loc et al. |
| 7,551,574 B1 | 6/2009 | Peden et al. |
| 7,602,820 B2 | 10/2009 | Helms et al. |
| 7,860,507 B2 | 12/2010 | Kalika et al. |
| 7,954,131 B2 | 5/2011 | Cholas et al. |
| 8,041,785 B2 | 10/2011 | Mazur et al. |
| 8,084,792 B2 | 12/2011 | Lehmann et al. |
| 8,306,634 B2 | 11/2012 | Nguyen et al. |
| 8,341,242 B2 | 12/2012 | Dillon et al. |
| 8,713,623 B2 | 4/2014 | Brooks |
| 8,838,863 B2 | 9/2014 | Henriksson et al. |
| 8,842,615 B1 | 9/2014 | Kalbag et al. |
| 8,862,155 B2 | 10/2014 | Stern et al. |
| 9,003,436 B2 | 4/2015 | Tidwell et al. |
| 9,027,062 B2 | 5/2015 | Patel et al. |
| 9,071,859 B2 | 6/2015 | Lajoie |
| 9,215,423 B2 | 12/2015 | Kimble et al. |
| 9,264,861 B1 | 2/2016 | Arastafar et al. |
| 9,918,345 B2 | 3/2018 | Gunasekara et al. |
| 9,935,833 B2 | 4/2018 | McAllister |
| 9,986,578 B2 | 5/2018 | Gunasekara |
| 10,164,858 B2 | 12/2018 | Gunasekara et al. |
| 10,327,187 B2* | 6/2019 | Yeddala ............... H04W 36/30 |
| 10,368,255 B2 | 7/2019 | Gunasekara et al. |
| 10,638,361 B2 | 4/2020 | Gunasekara et al. |
| 2003/0003909 A1 | 1/2003 | Keronen et al. |
| 2003/0056217 A1 | 3/2003 | Brooks |
| 2003/0210710 A1 | 11/2003 | Odman |
| 2004/0019691 A1 | 1/2004 | Daymond et al. |
| 2004/0045032 A1 | 3/2004 | Cummings et al. |
| 2004/0106403 A1 | 6/2004 | Mori et al. |
| 2004/0240478 A1 | 12/2004 | Goren et al. |
| 2005/0058112 A1 | 3/2005 | Lahey et al. |
| 2005/0176444 A1 | 8/2005 | Tanaka |
| 2005/0271133 A1 | 12/2005 | Waxman et al. |
| 2006/0154674 A1 | 7/2006 | Landschaft et al. |
| 2006/0165197 A1 | 7/2006 | Morita et al. |
| 2006/0218632 A1 | 9/2006 | Corley et al. |
| 2007/0033531 A1 | 2/2007 | Marsh |
| 2007/0086383 A1 | 4/2007 | Watanabe et al. |
| 2007/0115900 A1 | 5/2007 | Liang et al. |
| 2007/0195727 A1 | 8/2007 | Kinder et al. |
| 2007/0237077 A1 | 10/2007 | Patwardhan et al. |
| 2007/0263818 A1 | 11/2007 | Sumioka et al. |
| 2007/0266395 A1 | 11/2007 | Lee et al. |
| 2008/0037493 A1 | 2/2008 | Morton |
| 2008/0046542 A1 | 2/2008 | Sano et al. |
| 2008/0104634 A1 | 5/2008 | Gajdos et al. |
| 2008/0109307 A1 | 5/2008 | Ullah |
| 2008/0112405 A1 | 5/2008 | Cholas et al. |
| 2008/0134274 A1 | 6/2008 | Derrenberger et al. |
| 2008/0155614 A1 | 6/2008 | Cooper et al. |
| 2008/0182591 A1 | 7/2008 | Krikorian |
| 2008/0183705 A1 | 7/2008 | Shivaji-Rao et al. |
| 2008/0192820 A1 | 8/2008 | Brooks et al. |
| 2008/0235746 A1 | 9/2008 | Peters et al. |
| 2008/0281979 A1 | 11/2008 | Keeler |
| 2009/0013210 A1 | 1/2009 | McIntosh et al. |
| 2009/0028182 A1 | 1/2009 | Brooks et al. |
| 2009/0064251 A1 | 3/2009 | Savoor et al. |
| 2009/0077620 A1 | 3/2009 | Ravi et al. |
| 2009/0094648 A1 | 4/2009 | Patel et al. |
| 2009/0100459 A1 | 4/2009 | Riedl et al. |
| 2009/0116587 A1 | 5/2009 | Kwasinski et al. |
| 2009/0119751 A1 | 5/2009 | Koga |
| 2009/0125374 A1 | 5/2009 | Deaton et al. |
| 2009/0170479 A1 | 7/2009 | Jarenskog |
| 2009/0187939 A1 | 7/2009 | Lajoie |
| 2009/0210899 A1 | 8/2009 | Lawrence-Apfelbaum et al. |
| 2009/0244290 A1 | 10/2009 | McKelvey et al. |
| 2010/0014496 A1 | 1/2010 | Kalika et al. |
| 2010/0020683 A1 | 1/2010 | Gummalla et al. |
| 2010/0070867 A1 | 3/2010 | Lemmers |
| 2010/0081416 A1 | 4/2010 | Cohen |
| 2010/0144340 A1 | 6/2010 | Sudak |
| 2010/0150027 A1 | 6/2010 | Atwal et al. |
| 2010/0167743 A1* | 7/2010 | Palanki ............... H04B 7/2606 455/67.11 |
| 2010/0232355 A1 | 9/2010 | Richeson et al. |
| 2010/0251305 A1 | 9/2010 | Kimble et al. |
| 2010/0303022 A1 | 12/2010 | Maas et al. |
| 2010/0309051 A1 | 12/2010 | Moshfeghi |
| 2010/0312826 A1 | 12/2010 | Sarosi et al. |
| 2010/0313225 A1 | 12/2010 | Cholas et al. |
| 2011/0015989 A1 | 1/2011 | Tidwell et al. |
| 2011/0034179 A1 | 2/2011 | David et al. |
| 2011/0093900 A1 | 4/2011 | Patel et al. |
| 2011/0098076 A1 | 4/2011 | Kim et al. |
| 2011/0103374 A1 | 5/2011 | Lajoie et al. |
| 2011/0107389 A1 | 5/2011 | Chakarapani |
| 2011/0116428 A1 | 5/2011 | Seong et al. |
| 2011/0138064 A1 | 6/2011 | Rieger et al. |
| 2011/0158095 A1 | 6/2011 | Alexander et al. |
| 2011/0163888 A1 | 7/2011 | Goedde |
| 2011/0167440 A1 | 7/2011 | Greenfield |
| 2011/0179184 A1 | 7/2011 | Breau et al. |
| 2011/0182250 A1 | 7/2011 | Shin et al. |
| 2011/0206136 A1 | 8/2011 | Bekedam et al. |
| 2011/0225619 A1 | 9/2011 | Kesireddy et al. |
| 2011/0235577 A1 | 9/2011 | Hintermeister et al. |
| 2011/0285542 A1 | 11/2011 | Amsterdam et al. |
| 2011/0299411 A1 | 12/2011 | Chen et al. |
| 2011/0299422 A1 | 12/2011 | Kim et al. |
| 2012/0023535 A1 | 1/2012 | Brooks |
| 2012/0046049 A1 | 2/2012 | Curtis et al. |
| 2012/0054785 A1 | 3/2012 | Yang et al. |
| 2012/0079531 A1 | 3/2012 | Hasek et al. |
| 2012/0079546 A1 | 3/2012 | Kalidindi et al. |
| 2012/0115501 A1 | 5/2012 | Zheng |
| 2012/0151549 A1 | 6/2012 | Kumar et al. |
| 2012/0202447 A1 | 8/2012 | Edge et al. |
| 2012/0203822 A1 | 8/2012 | Floyd et al. |
| 2012/0222081 A1 | 8/2012 | Schaefer et al. |
| 2012/0230193 A1 | 9/2012 | Fang |
| 2012/0278654 A1 | 11/2012 | Shen et al. |
| 2012/0302259 A1 | 11/2012 | Busch |
| 2012/0330759 A1 | 12/2012 | Aggarwal et al. |
| 2013/0016648 A1 | 1/2013 | Koskela et al. |
| 2013/0017794 A1 | 1/2013 | Kloper et al. |
| 2013/0045681 A1 | 2/2013 | Dua |
| 2013/0046623 A1 | 2/2013 | Moritz et al. |
| 2013/0081097 A1 | 3/2013 | Park et al. |
| 2013/0100818 A1 | 4/2013 | Qiu et al. |
| 2013/0132789 A1 | 5/2013 | Watford et al. |
| 2013/0145152 A1 | 6/2013 | Maino et al. |
| 2013/0176885 A1 | 7/2013 | Lee et al. |
| 2013/0235774 A1 | 9/2013 | Jo et al. |
| 2013/0242812 A1 | 9/2013 | Khoryaev et al. |
| 2013/0260820 A1 | 10/2013 | Schmandt et al. |
| 2013/0308622 A1 | 11/2013 | Uhlik |
| 2013/0317892 A1 | 11/2013 | Heerboth |
| 2013/0322415 A1 | 12/2013 | Chamarti et al. |
| 2013/0342710 A1 | 12/2013 | Kanma |
| 2014/0010219 A1 | 1/2014 | Dor et al. |
| 2014/0010225 A1 | 1/2014 | Puregger |
| 2014/0019635 A1 | 1/2014 | Reznik et al. |
| 2014/0046624 A1 | 2/2014 | Miettinen |
| 2014/0056209 A1 | 2/2014 | Park et al. |
| 2014/0066098 A1 | 3/2014 | Stern et al. |
| 2014/0105061 A1 | 4/2014 | Kannan |
| 2014/0177611 A1 | 6/2014 | Corrales |
| 2014/0213256 A1 | 7/2014 | Meylan et al. |
| 2014/0242991 A1 | 8/2014 | Yanover et al. |

(56) References Cited

U.S. PATENT DOCUMENTS

| | | |
|---|---|---|
| 2014/0274110 A1 | 9/2014 | Mehta et al. |
| 2014/0280901 A1 | 9/2014 | Balachandran et al. |
| 2014/0287778 A1 | 9/2014 | Jones et al. |
| 2014/0308923 A1 | 10/2014 | Faulkner et al. |
| 2014/0328257 A1 | 11/2014 | Kamlani |
| 2014/0359649 A1 | 12/2014 | Cronk et al. |
| 2015/0009869 A1 | 1/2015 | Clegg |
| 2015/0036514 A1 | 2/2015 | Zhu et al. |
| 2015/0058883 A1 | 2/2015 | Tidwell et al. |
| 2015/0058909 A1 | 2/2015 | Miller et al. |
| 2015/0094098 A1 | 4/2015 | Stern et al. |
| 2015/0103685 A1 | 4/2015 | Butchko et al. |
| 2015/0106501 A1 | 4/2015 | Malets et al. |
| 2015/0140981 A1 | 5/2015 | Balasaygun |
| 2015/0146537 A1* | 5/2015 | Panaitopol ............ H04W 8/005 370/236 |
| 2015/0156129 A1 | 6/2015 | Tsuruoka |
| 2015/0215367 A1 | 7/2015 | Hayes et al. |
| 2015/0288617 A1 | 10/2015 | Dasher et al. |
| 2015/0288732 A1 | 10/2015 | Phillips et al. |
| 2015/0305082 A1 | 10/2015 | Elliott et al. |
| 2015/0350820 A1 | 12/2015 | Son et al. |
| 2015/0365833 A1 | 12/2015 | Stafford et al. |
| 2016/0066234 A1 | 3/2016 | Cho et al. |
| 2016/0066313 A1 | 3/2016 | Sun et al. |
| 2016/0105691 A1 | 4/2016 | Zucchetta |
| 2016/0119939 A1 | 4/2016 | Himayat et al. |
| 2016/0127185 A1 | 5/2016 | McAllister et al. |
| 2016/0143005 A1 | 5/2016 | Ghosh et al. |
| 2016/0204934 A1 | 7/2016 | Smith et al. |
| 2016/0242071 A1 | 8/2016 | Chen et al. |
| 2016/0261596 A1* | 9/2016 | Khello ................. H04W 12/06 |
| 2016/0315672 A1 | 10/2016 | Patwardhan et al. |
| 2017/0099327 A1 | 4/2017 | Negaluguli et al. |
| 2017/0223536 A1 | 8/2017 | Gupta et al. |
| 2017/0257750 A1 | 9/2017 | Gunasekara et al. |
| 2017/0265084 A1 | 9/2017 | Clegg |

OTHER PUBLICATIONS

Gomez, Conserving Transmission Power in Wireless Ad Hoc Networks, 2001, Network Protocols.

Gupta V., et al., "Bit-Stuffing in 802.11 Beacon Frame: Embedding Non-Standard Custom Information," International Journal of Computer Applications, Feb. 2013, vol. 63 (2), pp. 6-12.

"Internet Protocol, DARPA Internet Program, Protocol Specification", IETF RCF 791, Sep. 1981, 50 pages.

Miao, et al., "Distributed interference-aware energy-efficient power optimization," IEEE Transactions on Wireless Communications, Apr. 2011, vol. 10 (4), pp. 1323-1333.

\* cited by examiner

APPARATUS AND METHOD FOR WIRELESS NETWORK EXTENSIBILITY AND ENHANCEMENT

RELATED APPLICATIONS

Priority and Related Applications

The present application is a continuation of and claims priority to co-owned and U.S. patent application Ser. No. 16/443,718 filed on Jun. 17, 2019 entitled "APPARATUS AND METHOD FOR WIRELESS NETWORK EXTENSIBILITY AND ENHANCEMENT, and issuing as U.S. Patent No. 10,952,118 on Mar. 16, 2021, which is a divisional of and claims priority to co-owned U.S. patent application Ser. No. 14/959,948 of the same title filed on Dec. 4, 2015, and issued as U.S. Pat. No. 10,327,187 on Jun. 18, 2019, each of which are incorporated herein by reference in its entirety.

In addition, the present application is generally related to the subject matter of co-owned U.S. patent application Ser. No. 14/534,067 filed Nov. 5, 2014, entitled "METHODS AND APPARATUS FOR DETERMINING AN OPTIMIZED WIRELESS INTERFACE INSTALLATION CONFIGURATION", and issued as U.S. Pat. No. 9,935,833 on Apr. 4, 2018, U.S. patent application Ser. No. 14/302,313 filed Jun. 11, 2014 and entitled "METHODS AND APPARATUS FOR ACCESS POINT LOCATION" and U.S. patent application Ser. No. 14/959,885 filed on Dec. 4, 2015, entitled "APPARATUS AND METHODS FOR SELECTIVE DATA NETWORK ACCESS", and issued as U.S. Pat. No. 9,986,578 on May 29, 2018, each of the foregoing incorporated herein by reference in its entirety.

Copyright

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technological Field

The present disclosure relates generally to the field of wireless networks, and specifically in one implementation, to apparatus and methods for enabling a wireless client device to host, exchange, and transfer data to/from other wireless client devices. Various disclosed embodiments additionally extend and enhance wireless networks without requiring additional network service elements.

2. Description of Related Technology

Wireless networking technologies enable wireless devices to connect to one another. One common application for wireless technology is to provide network access to devices that are within a coverage area of a wireless network that is connected to the Internet. One such technology is Wi-Fi™ (IEEE Std. 802.11), which has become the de facto standard for wireless networking in consumer electronics. Wi-Fi enables multiple interconnected Access Points (APs, also commonly referred to as "hotspots") to provide coverage areas ranging from those as small as local coffee shops or residences, to entire corporate and academic campuses.

Commercially, Wi-Fi provides high value services in, for example, airports, hotels, and restaurants. Businesses and/or promotional events often provide Internet service to attract customers. Artisans of ordinary skill in the related arts will readily appreciate that typical wireless APs have an effective connectivity range on the order of one hundred (100) feet, depending on factors such as the presence or absence of buildings or other structures (and their materials of construction), and other interfering emitters. Large coverage areas can be formed by grouping together a number of APs with overlapping coverage. Unfortunately, large Wi-Fi deployments require significant upfront network planning, and capital outlays. Network providers must often trade-off coverage and/or quality of service (QoS) for cost considerations.

One current solution for expanding network coverage is so-called "mesh networking." In mesh networks, each node can relay messages to other nodes of the network; relaying may occur via any number of intermediary nodes (i.e., "hops"). Existing mesh networking technologies encompass fully connected meshes (i.e., where each node is connected to all other nodes) as well as partially-connected meshes (i.e., where nodes are connected to some subset of the total network). Mesh networks may employ both routing addressing (i.e., unicast) and so-called "flooding" address schemes (i.e., broadcast/multicast).

Mesh networking technologies are often useful in decentralized use cases; however, centralized network management is significantly complicated by the fluidly changing mechanics and/or topologies of mesh networks. Additionally, existing mesh network technologies have not been readily incorporated within the context of wireless local area networks (WLANs). For example, incipient research into implementing mesh networking within WLANs has largely been confined to service nodes (e.g., only the APs are meshed). In such deployments, the wireless controllers manage the service nodes and wireless clients in a controlled environment, and the wireless devices connect via a traditional network service (e.g., legacy Wi-Fi operation).

To these ends, solutions are needed to extend and enhance existing network technologies. Specifically, desirable solutions and improvements would enable wireless network providers to expand their coverage over larger areas, preferably with minimal outlays of capital and/or network infrastructure (e.g., APs), and with substantial flexibility.

SUMMARY

The present disclosure addresses the foregoing needs by providing, inter alia, methods and apparatus for wireless network extensibility and management.

In one aspect of the disclosure, a method of extending coverage in a wireless network is provided. In one embodiment, the network includes a network access point in data communication with a network control entity, and the method includes: identifying a wireless user device in wireless data communication with the network access point; communicating, from the network control entity to the wireless user device via the network access point, one or more data elements, the one or more data elements configured to cause the wireless user device to advertise itself as an available access point to at least one other wireless user device which is within communications range of the wireless user device yet which is not within communications range of the network access point; and upon association of the one other wireless user device with the wireless user device, causing establishment of communications between the one other wireless user device with at least the network control entity such that: (i) the one other wireless user device and the network entity can transact data via the wireless user device; and (ii) the wireless user device can transact data with the network control entity in tandem with the data transaction between the one other wireless user device and the network control entity.

In one variant, communications between the network access point and the wireless user device are conducted according to a wireless local area network (WLAN) protocol, and communications between the wireless user device and the one other wireless user device are also conducted according to the WLAN protocol. The wireless user device and the one other wireless user device comprise, in one implementation, peers with respect to the network access point.

In another variant, the wireless user device acts as a pass-through for communications between the one other wireless user device and the network access point.

In a further variant, the wireless user device acts as a host entity for communications between the one other wireless user device and the network access point, and the communications between the one other wireless user device and the network access point include: first communications generated by the one other wireless user device and addressed to the wireless user device; and second communications generated by the wireless user device and addressed to the network access point, the second communications based at least at least in part on the first communications. In one implementation, the first communications comprise use of a first secure data protocol, and the second communications comprise use of a second secure data protocol, such as wherein the first secure data protocol comprises a first session between the one other wireless user device and the wireless user device, and the second secure data protocol comprises a second session between the wireless user device and the network access point.

In another variant, the method further includes downloading at least one computer program to the wireless user device via a wireless interface thereof, the at least one computer program operative to, when executed on the wireless user device, enable the advertisement in response to receipt of the one or more data elements. Provisioning of the at least one computer program after the downloading may also be conducted, the provisioning comprising e.g., utilizing at least the network control entity to cause configuration of at least a portion of the at least one computer program using data transmitted from the network control entity.

In another aspect, a method of operating a wireless network is disclosed. In one embodiment, the network includes a network access point in data communication with a network control entity, and the method comprises: determining that a wireless user device in wireless data communication with the network access point requires handover to another access point; communicating, from the network control entity to another wireless user device via the network access point, one or more data elements, the one or more data elements configured to cause the another wireless user device to enable data communications with the wireless user device when the wireless user device and another wireless user device are within communications range of one another; and upon association of the wireless user device with the another wireless user device, causing establishment of communication between the wireless user device with at least the network control entity.

In one variant, the determination that a wireless user device in wireless data communication with the network access point requires handover to another access point includes evaluating at least one parameter associated with a wireless link between the wireless user device and the network access point to identify degradation of performance of the link. In one implementation, the evaluation of at least one parameter associated with a wireless link comprises evaluating a received signal strength indication relative to a prescribed threshold value.

In another implementation, the evaluation of at least one parameter associated with a wireless link comprises evaluating a bit error rate (BER).

In yet another implementation, the evaluation of at least one parameter associated with a wireless link comprises evaluating the at least one parameter using the network control entity to analyze one or more data values forwarded thereto via the network access point.

In another variant, the causation of the another wireless user device to enable data communications with the wireless user device comprises at least transmission of one or more beacons from the another wireless user device, the one or more beacons advertising the another wireless user device as an available access point.

In a further variant, the causation of the another wireless user device to enable data communications with the wireless user device comprises at least transmission of one or more beacons from the another wireless user device, the one or more beacons comprising a service set identifier (SSID) also used by the network access point.

In yet another variant, the method further includes maintaining an existing session previously established between the wireless user device and the network access point for the communication between the wireless user device with at least the network control entity after the association of the wireless user device with the another wireless user device.

In still another variant, the communicating, from the network control entity to another wireless user device via the network access point, one or more data elements, comprises communicating with a software entity operative to run on the another wireless user device via one or more customized application programming interfaces (APIs).

In another aspect, a non-transitory computer readable storage apparatus is disclosed. In one embodiment, the storage apparatus has a storage medium, the storage medium having at least one computer program having a plurality of instructions, the plurality of instructions configured to be executed on a processing apparatus of a wireless-enabled user device in data communication with the computer readable storage apparatus. The wireless-enabled user device further includes a wireless interface in data communication with the processor apparatus, and the plurality of instructions are configured to, when executed, cause the wireless-enabled user apparatus to: receive data from a network entity via the wireless interface; utilize the received data to enable the wireless-enabled user device to cause transmission, via the wireless interface, of beacon data, the beacon data advertising the wireless-enabled user device as an access point for other wireless-enabled devices; receive data from one or more other wireless-enabled devices substantially in response to the beacon data; establish an association between the one or more other wireless-enabled devices; and establish a session between the one or more other wireless-enabled user devices and the network entity.

In one variant, the at least one computer program includes: a first software process configured to enable communication between the at least one computer program and one or more software applications resident on the wireless-enabled user device; and a second software process configured to enable communication between the at least one computer program and one or more device drivers of the wireless-enabled user device. In one implementation, the first and the second software processes each include application programming interfaces (APIs); and the at least one computer program further includes a radio frequency (RF) bandwidth calculation process in logical communication with the APIs, and an application bandwidth registry process in logical communication with the RF bandwidth process.

In a further aspect, a network apparatus for use within a wireless network is disclosed. In one embodiment, the network apparatus includes: a computerized controller entity, the controller entity comprising at least one computer program operative to run on a processing apparatus of the controller entity, and a backhaul data interface configured for data communication with a packet-switched network; and a plurality of wireless access points in data communication with the controller entity, the access points each comprising a wireless interface having a communications range associated therewith.

In one variant, the at least one computer program further includes a plurality of instructions which, when executed by the processor apparatus, cause at least one of the wireless access points to: transmit data to a peer-enabled wireless user device within a communications range thereof, the transmitted data configured to enable the peer-enabled wireless user device to cause transmission, via a wireless interface thereof, of beacon data, the beacon data advertising the peer-enabled wireless user device as an access point for other wireless user devices; receive data initiated from one or more other wireless user devices associated with the peer-enabled wireless user device; and utilize a session between the one or more other wireless user devices and the computerized controller entity, the session used to enable access by the one or more other user devices to an internetwork in data communication with the network apparatus via the backhaul interface.

In another variant, the network apparatus is further configured to determine that the one or more other wireless user devices in wireless data communication with one of the wireless access points requires handover to another access point; and the utilization of the session comprises maintaining an existing, previously established communications session between the one or more other wireless user devices and the computerized controller entity, so as to make the handoff to the peer-enabled wireless user device substantially seamless to the one or more other wireless user devices.

In yet a further aspect, a peer-enabled wireless user device is disclosed. In one embodiment, the device includes a WLAN (i.e., Wi-Fi) interface and peer management computer software and/or firmware operative to run on the device and configured to manage establishment of associations with other Wi-Fi-enabled user devices, and connection to one or more network access points, such that the peer-enabled device is capable of acting as an AP for the other Wi-Fi-enabled devices, such as when the latter are out of range of a network operator's (e.g., MSO) AP.

In still another aspect, a peer control module is disclosed. In one embodiment, the module comprises a software process (e.g., application layer program, and/or middleware) resident on a wireless user device protocol stack and configured to interface with application layer programs and device derives so as to implement wireless access point and peer associations.

In a further aspect, a network controller entity is disclosed. In one embodiment, the controller entity is configured to communicate with a plurality of wireless (e.g., WLAN) APs so as to manage connectivity and wireless coverage afforded by the network to user devices via, e.g., handoffs between the APs and one or more wireless network clients (WNCs) also within the network.

These and other aspects shall become apparent when considered in light of the disclosure provided herein.

Figure 1:
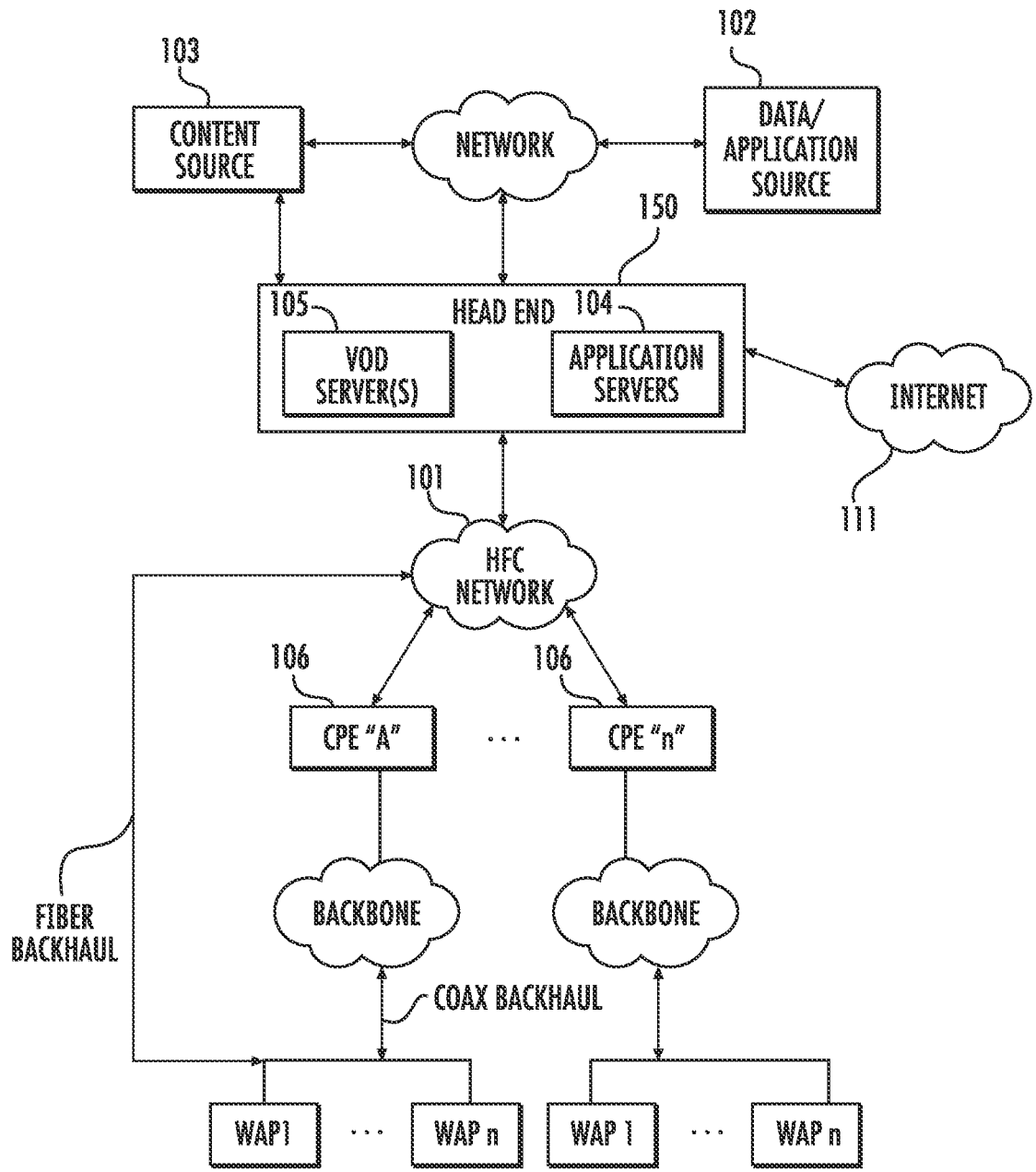
FIG. 1 is a functional block diagram illustrating an exemplary hybrid fiber network configuration useful with various aspects of the present disclosure.

All figures © Copyright 2015 Time Warner Enterprises LLC. All rights reserved.

DETAILED DESCRIPTION

Reference is now made to the drawings wherein like numerals refer to like parts throughout.

As used herein, the term "application" refers generally and without limitation to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could include a downloadable Java Xlet™ that runs within the JavaTV™ environment.

As used herein, the term "client device" includes, but is not limited to, set-top boxes (e.g., DSTBs), gateways, modems, personal computers (PCs), and minicomputers, whether desktop, laptop, or otherwise, and mobile devices such as handheld computers, PDAs, personal media devices (PMDs), tablets, "phablets", and smartphones.

As used herein, the term "codec" refers to a video, audio, or other data coding and/or decoding algorithm, process or apparatus including, without limitation, those of the MPEG (e.g., MPEG-1, MPEG-2, MPEG-4/H.264, etc.), Real (RealVideo, etc.), AC-3 (audio), DiVX, XViD/ViDX, Windows Media Video (e.g., WMV 7, 8, 9, 10, or 11), ATI Video codec, or VC-1 (SMPTE standard 421M) families.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.) and the like.

The term "Customer Premises Equipment (CPE)" refers without limitation to any type of electronic equipment located within a customer's or subscriber's premises and connected to or in communication with a network.

As used herein, the term "display" means any type of device adapted to display information, including without limitation CRTs, LCDs, TFTs, plasma displays, LEDs (e.g., OLEDs), incandescent and fluorescent devices, or combinations/integrations thereof. Display devices may also include less dynamic devices such as, for example, printers, e-ink devices, and the like.

As used herein, the term "DOCSIS" refers to any of the existing or planned variants of the Data Over Cable Services Interface Specification, including for example DOCSIS versions 1.0, 1.1, 2.0, 3.0 and 3.1.

As used herein, the term "headend" refers generally to a networked system controlled by an operator (e.g., an MSO) that distributes programming to MSO clientele using client devices. Such programming may include literally any information source/receiver including, inter alia, free-to-air TV channels, pay TV channels, interactive TV, and the Internet.

As used herein, the terms "Internet" and "internet" are used interchangeably to refer to inter-networks including, without limitation, the Internet.

As used herein, the term "memory" includes any type of integrated circuit or other storage device adapted for storing digital data including, without limitation, ROM. PROM, EEPROM, DRAM, SDRAM, DDR/2 SDRAM, EDO/FPMS, RLDRAM, SRAM, "flash" memory (e.g., NAND/NOR), and PSRAM.

As used herein, the terms "microprocessor" and "processor" or "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable computer fabrics (RCFs), array processors, secure microprocessors, and application-specific integrated circuits (ASICs). Such digital processors may be contained on a single unitary IC die, or distributed across multiple components.

As used herein, the terms "MSO" or "multiple systems operator" refer to a cable, satellite, or terrestrial network provider having infrastructure required to deliver services including programming and data over those mediums.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, WAP, SIP, UDP, FTP, RTP/RTCP, H.323, etc.).

As used herein, the term "network interface" refers to any signal or data interface with a component or network including, without limitation, those of the FireWire (e.g., FW400, FW800, etc.), USB (e.g., USB2), Ethernet (e.g., 10/100, 10/100/1000 (Gigabit Ethernet), 10-Gig-E, etc.), MoCA, Coaxsys (e.g., TVnet™), radio frequency tuner (e.g., in-band or OOB, cable modem, etc.), Wi-Fi (802.11), WiMAX (802.16), Zigbee®, Z-wave, PAN (e.g., 802.15), power line carrier (PLC), or IrDA families.

As used herein, the term "QAM" refers to modulation schemes used for sending signals over cable networks. Such modulation scheme might use any constellation level (e.g. QPSK, 16-QAM, 64-QAM, 256-QAM, etc.) depending on details of a cable network. A QAM may also refer to a physical channel modulated according to the schemes.

As used herein, the term "server" refers to any computerized component, system or entity regardless of form which is adapted to provide data, files, applications, content, or other services to one or more other devices or entities on a computer network.

As used herein, the term "storage" refers to without limitation computer hard drives, DVR device, memory, RAID devices or arrays, optical media (e.g., CD-ROMs, Laserdiscs, Blu-Ray, etc.), or any other devices or media capable of storing content or other information.

As used herein, the term "Wi-Fi" refers to, without limitation, any of the variants of IEEE-Std. 802.11 or related standards including 802.11 a/b/g/n/s/v/ac or 802.11-2012.

As used herein, the term "wireless" means any wireless signal, data, communication, or other interface including without limitation Wi-Fi, Bluetooth, 3G (3GPP/3GPP2), HSDPA/HSUPA, TDMA, CDMA (e.g., IS-95A, WCDMA, etc.), FHSS, DSSS, GSM, PAN/802.15, WiMAX (802.16), 802.20, Zigbee®, Z-wave, narrowband/FDMA, OFDM, PCS/DCS, LTE/LTE-A, analog cellular, CDPD, satellite systems, millimeter wave or microwave systems, acoustic, and infrared (i.e., IrDA).

Overview

In one aspect of the present disclosure, an exemplary wireless network is configured to use in-service Wireless Network Clients (WNCs), such as mobile phones, laptops, etc., to extend and enhance the wireless network coverage. More directly, the WNCs are configured to operate as Service Access Nodes (SANs) to other wireless client devices that are/were registered in the same network. In one exemplary embodiment, a SAN has both peer-to-peer communications capabilities (to communicate with wireless clients) and gateway functionality (to aggregate data traffic over its own uplink communications).

In one implementation, so-called logical "Peer Control Manager (PCM)" entities associated with each WNC enable, disable, and control the service functions for that WNC. The PCM can include for example a software application (e.g., "app") that can be downloaded and executed on legacy wireless client devices. Each PCM exchanges service control information over the wireless medium with other wireless clients (which may or may not also have PCM software) to enable the wireless client to join the wireless network.

A customized "Peer Controller (PC)" is also disclosed that, in one implementation, is a network-side entity which provides centralized control of the wireless network and its constituent peer-to-peer sub-networks. The exemplary peer-to-peer sub-network operates as a subset of the wireless network (for instance, the peer-to-peer sub-network has the same Service Set Identifier (SSID)). The principles described herein may also be extended to support full-fledged peer networks (e.g., with distinct SSIDs). In one such implementation, the PC controls the wireless network (via access points) and the corresponding peer-to-peer sub-networks (via WNCs) to enable, disable, and/or restrict service provision.

As described in greater detail hereinafter, the PC may additionally coordinate and manage higher level network functionality. For example, in some embodiments, the PC interacts with an Authentication, Authorization, and Accounting (AAA) service for authorization and policy enforcement functions. Similarly, the PC may track and/or provide accounting info in the network provider. More generally, the PC manages service activation and controls the PCMs.

Detailed Description of Exemplary Embodiments

Exemplary embodiments of the apparatus and methods of the present disclosure are now described in detail. While these exemplary embodiments are described in the context of the previously mentioned hybrid fiber coax (HFC) cable architecture having a multiple systems operator (MSO), digital networking capability, IP delivery capability, and a plurality of client devices/CPE, the general principles and advantages of the disclosure may be extended to other types of networks and architectures that are configured to deliver digital media data (e.g., text, video, and/or audio). Such other networks or architectures may be broadband, narrowband, wired or wireless, or otherwise, the following therefore being merely exemplary in nature.

It will also be appreciated that while described generally in the context of a network providing service to a customer or consumer (i.e., residential) end user domain, the present disclosure may be readily adapted to other types of environments including, e.g., commercial/enterprise, and government/military applications. Myriad other applications are possible.

Also, while certain aspects are described primarily in the context of the well-known Internet Protocol (described in, inter alia, *Internet Protocol DARPA Internet Program Protocol Specification*, IETF RCF 791 (September 1981) and Deering, et al., *Internet Protocol, Version 6 (IPv6) Specification*, IETF RFC 2460 (December 1998) each of which is incorporated herein by reference in its entirety), it will be appreciated that the present disclosure may utilize other types of protocols (and in fact bearer networks to include other internets and intranets) to implement the described functionality.

Other features and advantages of the present disclosure will immediately be recognized by persons of ordinary skill in the art with reference to the attached drawings and detailed description of exemplary embodiments as given below.

Service Provider Network—

FIG. 1 illustrates a typical service provider network configuration useful with the features of the wireless network described herein. This service provider network 100 is used in one embodiment of the disclosure to provide backbone and Internet access from the service provider's wireless access points (e.g., Wi-Fi AP's). As opposed to an unmanaged network, the managed service-provider network of FIG. 1 advantageously allows, inter alia, control and management of a given user's access via the wireless access point(s), including imposition and/or reconfiguration of various access "rules" or other configurations applied to the wireless access points. As but one example, the wireless access points (see discussion of FIG. 2 infra) disposed at the service location(s) can be coupled to the bearer managed network (FIG. 1) via e.g., a cable modem termination system (CMTS) and associated local DOCSIS modem, a wireless bearer medium (e.g., an 802.16 WiMAX system), a fiber-based system such as FiOS or similar, a third-party medium which the managed network operator has access to (which may include any of the foregoing), or yet other means.

Advantageously, the service provider network 100 also allows components at the service location (e.g., Wi-Fi APs and any supporting infrastructure such as routers, switches, MIMO or modulation coding scheme (MCS) or other physical layer (PHY) configurations, etc.) to be remotely reconfigured by the network MSO, based on e.g., prevailing operational conditions in the network, changes in user population and/or makeup of users at the service location, business models (e.g., to maximize profitability), etc.

The various components of the exemplary embodiment of the network 100 include (i) one or more data and application origination points 102; (ii) one or more content sources 103, (iii) one or more application distribution servers 104; (iv) one or more VOD servers 105, and (v) customer premises equipment (CPE) 106. The distribution server(s) 104, VOD servers 105 and CPE(s) 106 are connected via a bearer (e.g., HFC) network 101. A simple architecture comprising one of each of the aforementioned components 102, 103, 104, 105, 106 is shown in FIG. 1 for simplicity, although it will be recognized that comparable architectures with multiple origination points, distribution servers, VOD servers, and/or CPE devices (as well as different network topologies) may be utilized consistent with the present disclosure. For example, the headend architecture of FIG. 1*a* (described in greater detail below), or others, may be used.

Also shown in FIG. 1 are exemplary wireless access points (WAPs), discussed in greater detail below, which are serviced (backhauled) via one or more of a coaxial cable backhaul or an optical fiber backhaul, although yet other approaches may be used consistent with the disclosure (e.g., millimeter wave). For example, the WAPs may be serviced by one or more coaxial drops to the WAP location(s) from e.g., a DOCSIS cable modem (e.g., one of the CPE 106 shown in FIG. 1) and local "backbone". Alternatively, a direct fiber drop (e.g., FTTH or FTTC) may be used as shown. Any number of different configurations will be appreciated by those of ordinary skill in the art given the present disclosure.

Figure 1A:
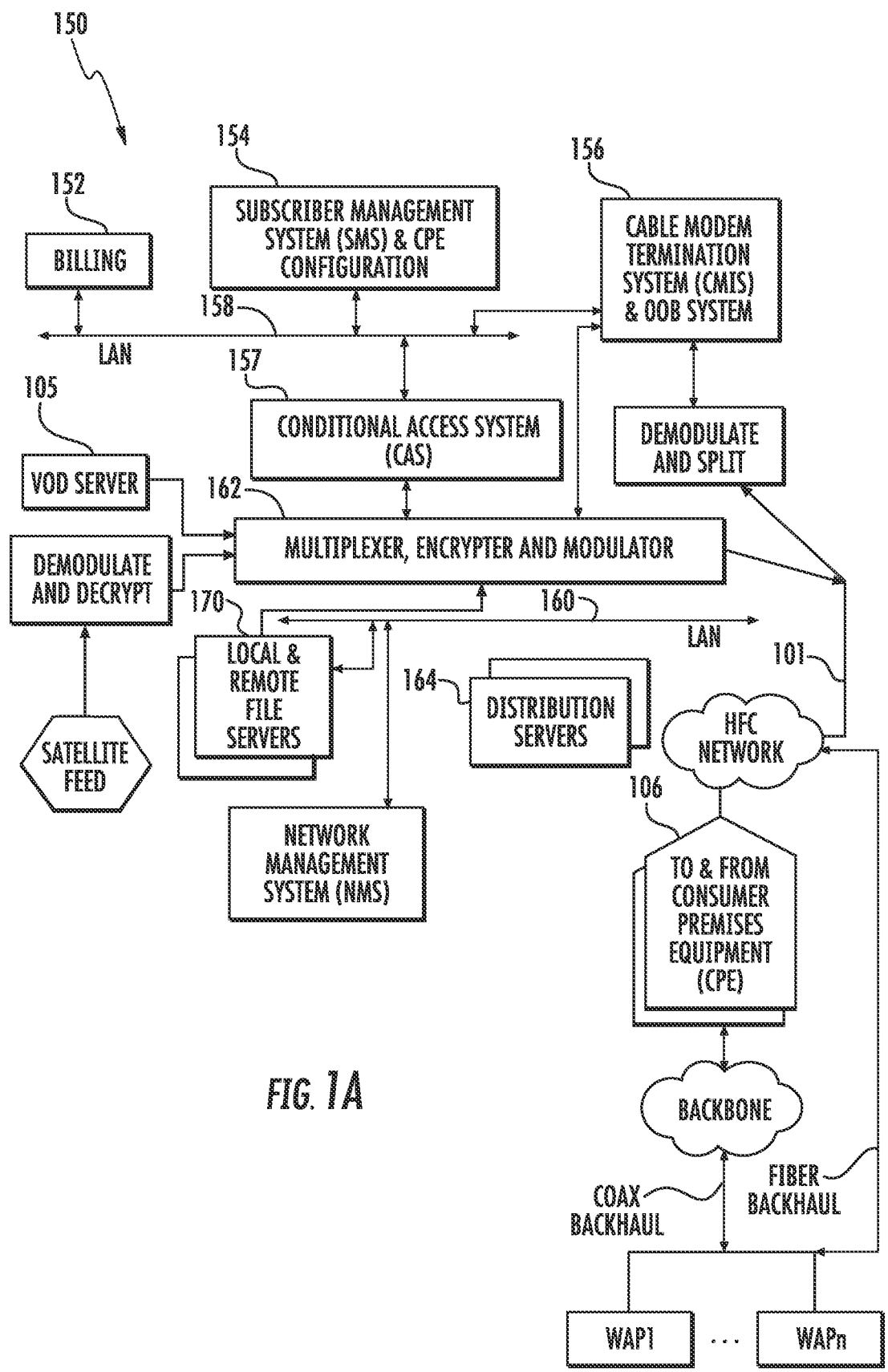
FIG. 1a is a functional block diagram illustrating one exemplary network headend configuration useful with various aspects of the present disclosure.

FIG. 1a shows one exemplary embodiment of a headend architecture. As shown in FIG. 1a, the headend architecture 150 comprises typical headend components and services including billing module 152, subscriber management system (SMS) and CPE configuration management module 154, cable-modem termination system (CMTS) and OOB system 156, as well as LAN(s) 158, 160 placing the various components in data communication with one another. It will be appreciated that while a bar or bus LAN topology is illustrated, any number of other arrangements as previously referenced (e.g., ring, star, etc.) may be used consistent with the disclosure. It will also be appreciated that the headend configuration depicted in FIG. 1a is high-level, conceptual architecture, and that each MSO may have multiple headends deployed using custom architectures.

Figure 1B:
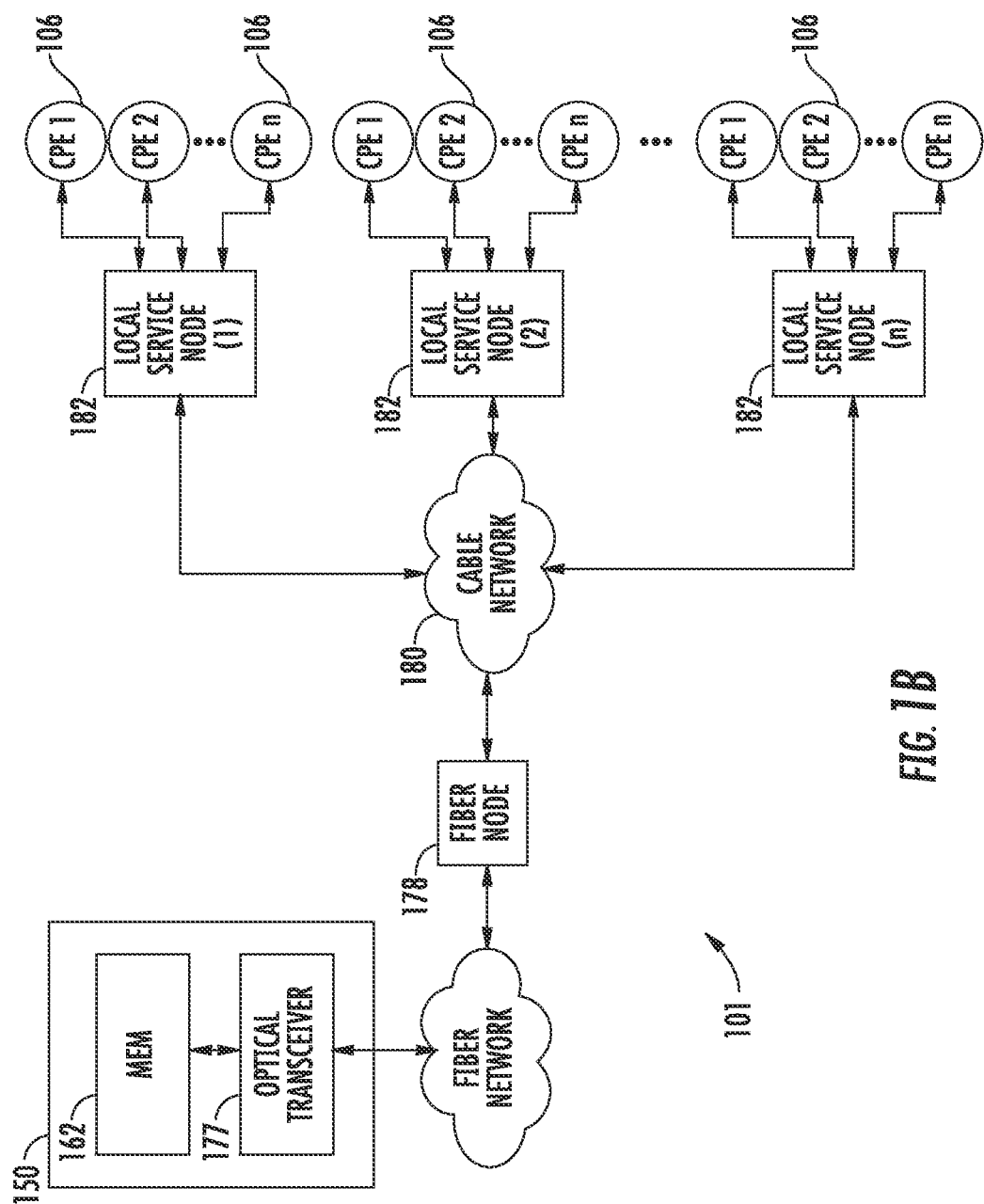
FIG. 1B is a functional block diagram illustrating one exemplary local service node configuration useful with various aspects of the present disclosure.

The exemplary architecture 150 of FIG. 1a further includes a conditional access system (CAS) 157 and a multiplexer-encrypter-modulator (MEM) 162 coupled to the HFC network 101 adapted to process or condition content for transmission over the network. The distribution servers 164 are coupled to the LAN 160, which provides access to the MEM 162 and network 101 via one or more file servers 170. The VOD servers 105 are coupled to the LAN 160 as well, although other architectures may be employed (such as for example where the VOD servers are associated with a core switching device such as an 802.3z Gigabit Ethernet device). As previously described, information is carried across multiple channels. Thus, the headend must be adapted to acquire the information for the carried channels from various sources. Typically, the channels being delivered from the headend 150 to the CPE 106 ("downstream") are multiplexed together in the headend, as previously described and sent to neighborhood hubs (FIG. 1B) via a variety of interposed network components.

Content (e.g., audio, video, data, files, etc.) is provided in each downstream (in-band) channel associated with the relevant service group. To communicate with the headend or intermediary node (e.g., hub server), the CPE 106 may use the out-of-band (OOB) or DOCSIS channels and associated protocols. The OCAP 1.0, 2.0, 3.0, 3.1 (and subsequent) specification provides for exemplary networking protocols both downstream and upstream, although the present disclosure is in no way limited to these approaches.

Figure 1C:
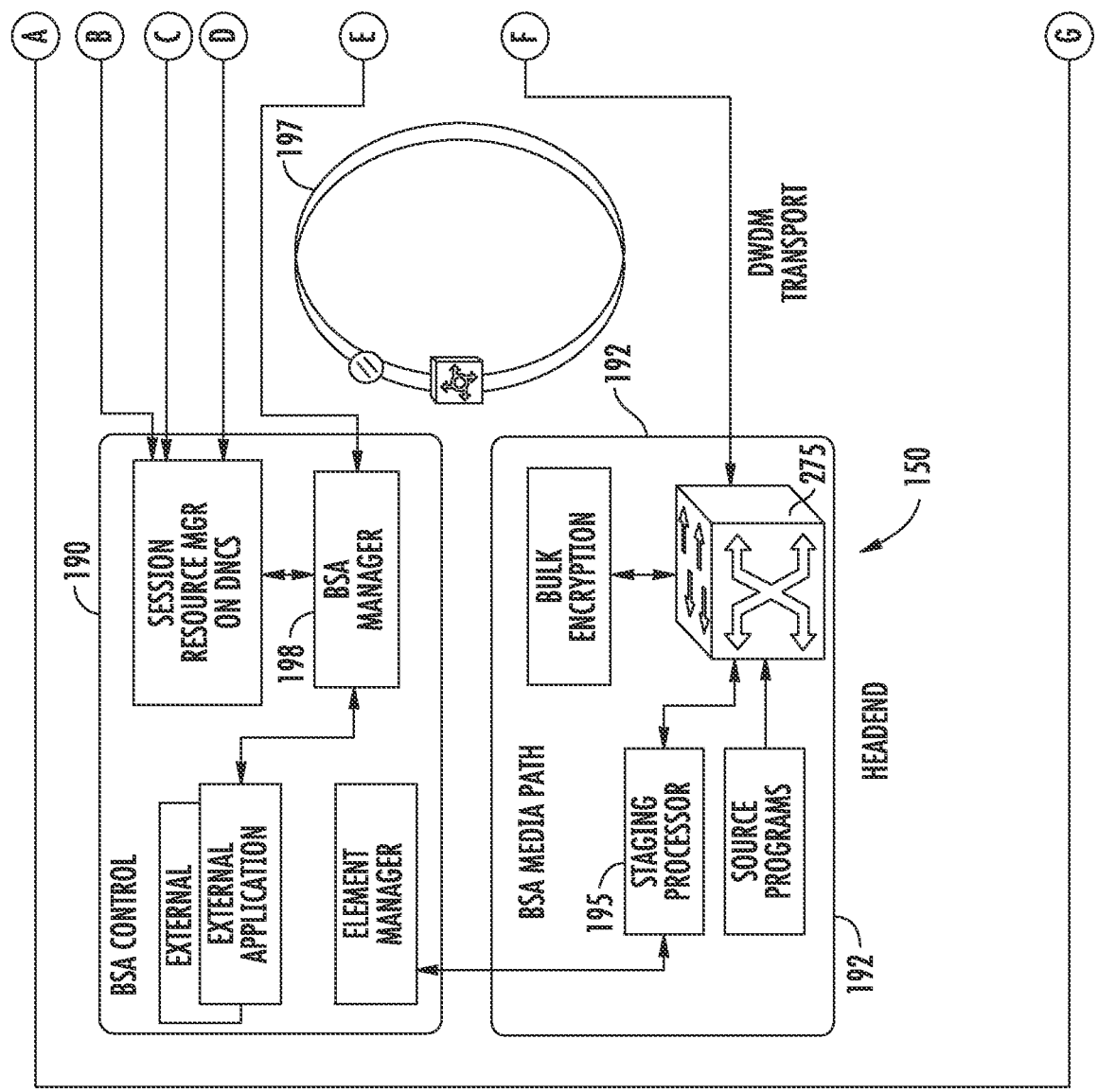
FIG. 1c is a functional block diagram illustrating one exemplary broadcast switched architecture (BSA) network useful with various aspects of the present disclosure.
Figure 1C:
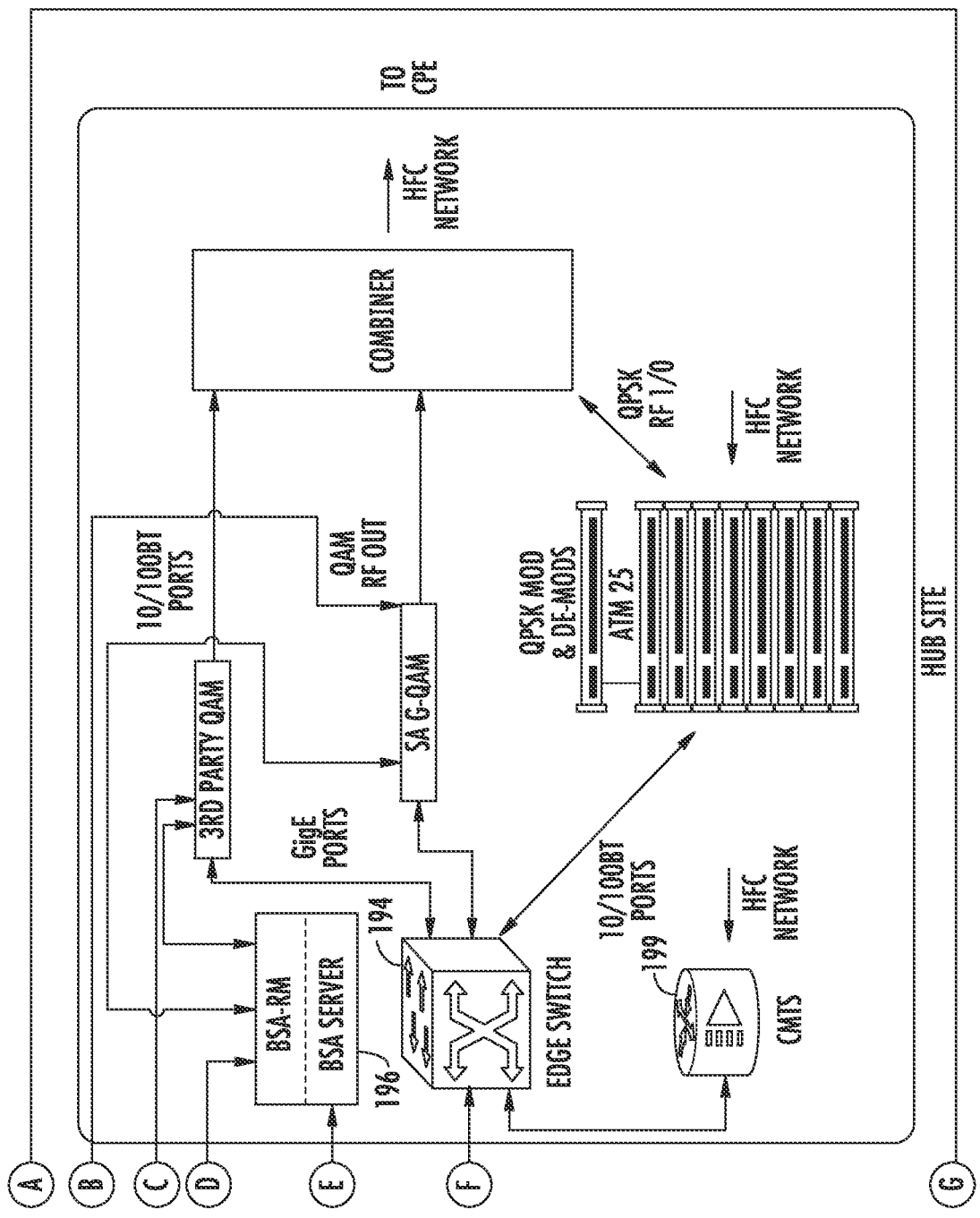

FIG. 1c illustrates an exemplary "switched" network architecture which may be used consistent with the present disclosure for, inter alia, provision of services to the wireless access points of interest. Specifically, the headend 150 contains switched broadcast control 190 and media path functions 192; these element cooperating to control and feed, respectively, downstream or edge switching devices 194 at the hub site which are used to selectively switch broadcast streams to various service groups. BSA (broadcast switched architecture) media path 192 may include a staging processor 195, source programs, and bulk encryption in communication with a switch 275. A BSA server 196 is also disposed at the hub site, and implements functions related to switching and bandwidth conservation (in conjunction with a management entity 198 disposed at the headend). An optical transport ring 197 is utilized to distribute the dense wave-division multiplexed (DWDM) optical signals to each hub in an efficient fashion.

In addition to "broadcast" content (e.g., video programming), the systems of FIGS. 1a and 1c (and 1d discussed below) also deliver Internet data services using the Internet protocol (IP), although other protocols and transport mechanisms of the type well known in the digital communication art may be substituted. One exemplary delivery paradigm comprises delivering MPEG-based video content, with the video transported to user PCs (or IP-based STBs) over the aforementioned DOCSIS channels comprising MPEG (or other video codec such as H.264 or AVC) over IP over MPEG. That is, the higher layer MPEG- or other encoded content is encapsulated using an IP protocol, which then utilizes an MPEG packetization of the type well known in the art for delivery over the RF channels. In this fashion, a parallel delivery mode to the normal broadcast delivery exists; i.e., delivery of video content both over traditional downstream QAMs to the tuner of the user's STB or other receiver device for viewing on the television, and also as packetized IP data over the DOCSIS QAMs to the user's PC or other IP-enabled device via the user's cable modem. Delivery in such packetized modes may be unicast, multicast, or broadcast.

Referring again to FIG. 1c, the IP packets associated with Internet services are received by edge switch 194, and in one embodiment forwarded to the cable modem termination system (CMTS) 199. The CMTS examines the packets, and forwards packets intended for the local network to the edge switch 194. Other packets are discarded or routed to another component.

The edge switch 194 forwards the packets receive from the CMTS 199 to the QAM modulator 189, which transmits the packets on one or more physical (QAM-modulated RF) channels to the CPE. The IP packets are typically transmitted on RF channels (e.g., DOCSIS QAMs) that are different that the RF channels used for the broadcast video and audio programming, although this is not a requirement. The CPE 106 are each configured to monitor the particular assigned RF channel (such as via a port or socket ID/address, or other such mechanism) for IP packets intended for the subscriber premises/address that they serve.

Figure 1D:
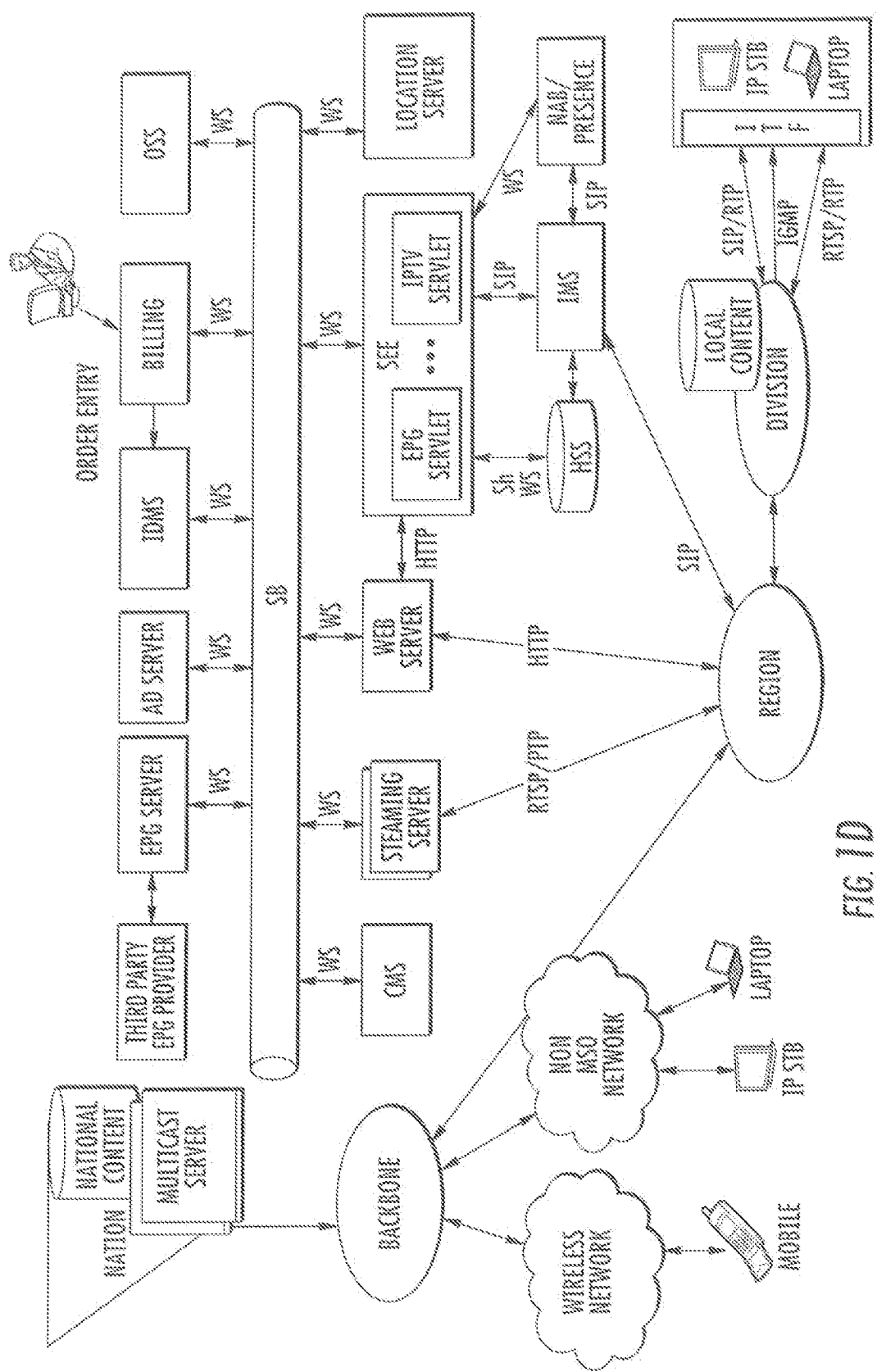
FIG. 1d is a functional block diagram illustrating one exemplary packetized content delivery network architecture useful with various aspects of the present disclosure.

While the foregoing network architectures described herein can (and in fact do) carry packetized content (e.g., IP over MPEG for high-speed data or Internet TV, MPEG2 packet content over QAM for MPTS, etc.), they are often not optimized for such delivery. Hence, in accordance with another embodiment of the disclosure, a "packet optimized" delivery network is used for carriage of the packet content (e.g., IPTV content). FIG. 1d illustrates one exemplary implementation of such a network, in the context of a 3GPP IMS (IP Multimedia Subsystem) network with common control plane and service delivery platform (SDP), as described in co-pending U.S. Provisional Patent Application Ser. No. 61/256,903 filed Oct. 30, 2009 and entitled "METHODS AND APPARATUS FOR PACKETIZED CONTENT DELIVERY OVER A CONTENT DELIVERY NETWORK", which is now published as U.S. Patent Application Publication No. 2011/0103374 of the same title filed on Apr. 21, 2010, each of which is incorporated herein by reference in its entirety. Such a network provides, inter alia, significant enhancements in terms of common control of different services, implementation and management of content delivery sessions according to unicast or multicast models, etc.; however, it is appreciated that the various features of the present disclosure are in no way limited to this or any of the other foregoing architectures.

Wireless Network Architecture and Methods-

Figure 2:
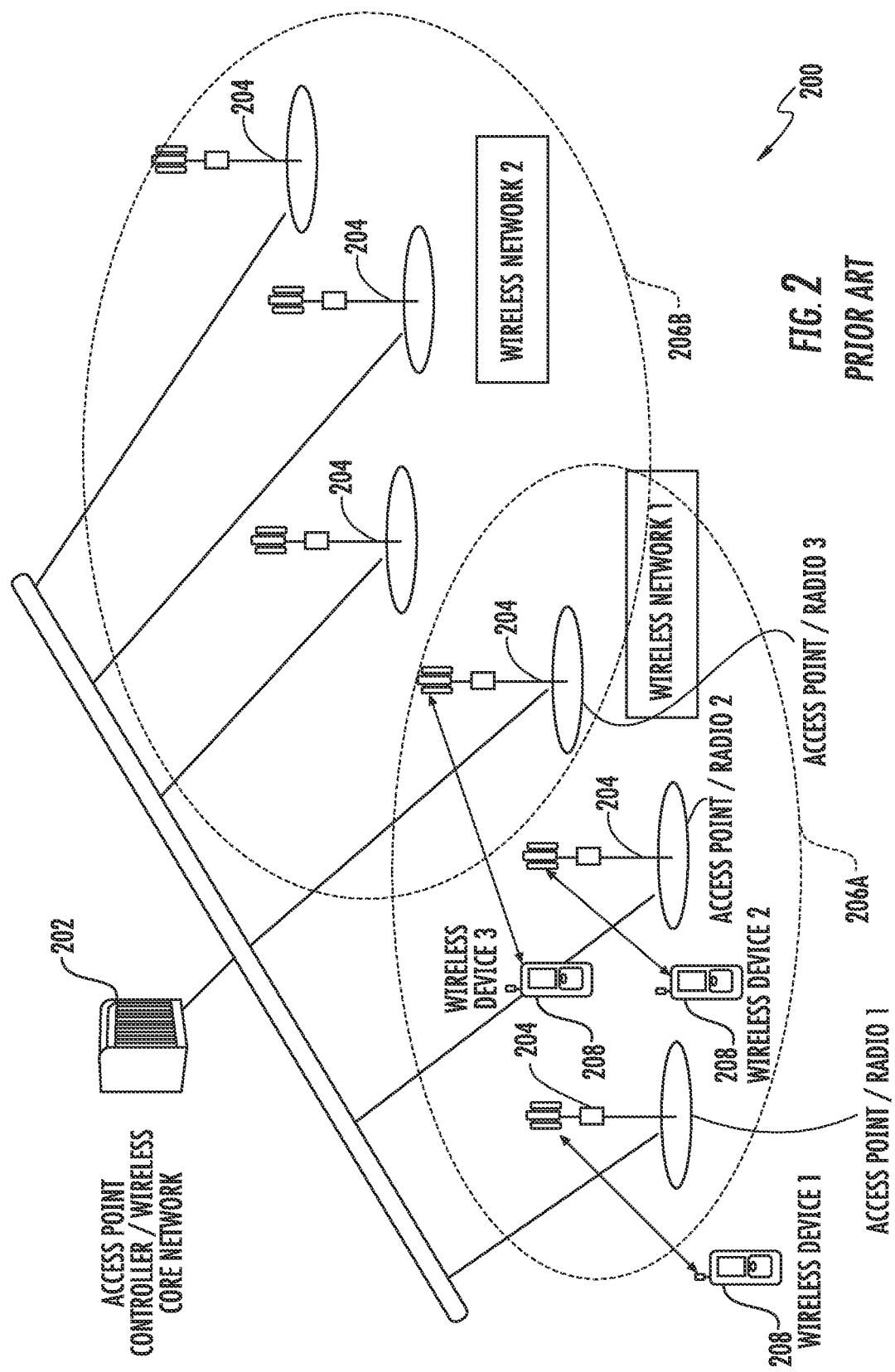
FIG. 2 is a functional block diagram illustrating one prior art wireless network.

FIG. 2 illustrates a typical prior art wireless network 200. As shown, the prior art network includes an access point controller/wireless core network 202 that operates as a service node for a number of access points 204 to e.g., the broader Internet (not shown). Each of the access points 204 is further configured to provide wireless network coverage 206 (wireless network 206A and wireless network 206B) to directly service one or more wireless client devices 208. For example, in one use scenario, the wireless client devices 208 are able to access the Internet via the wireless networks 206; in other deployments, the wireless client devices 208 may be able to access corporate and/or academic internets or intranets, etc.

Figure 3:
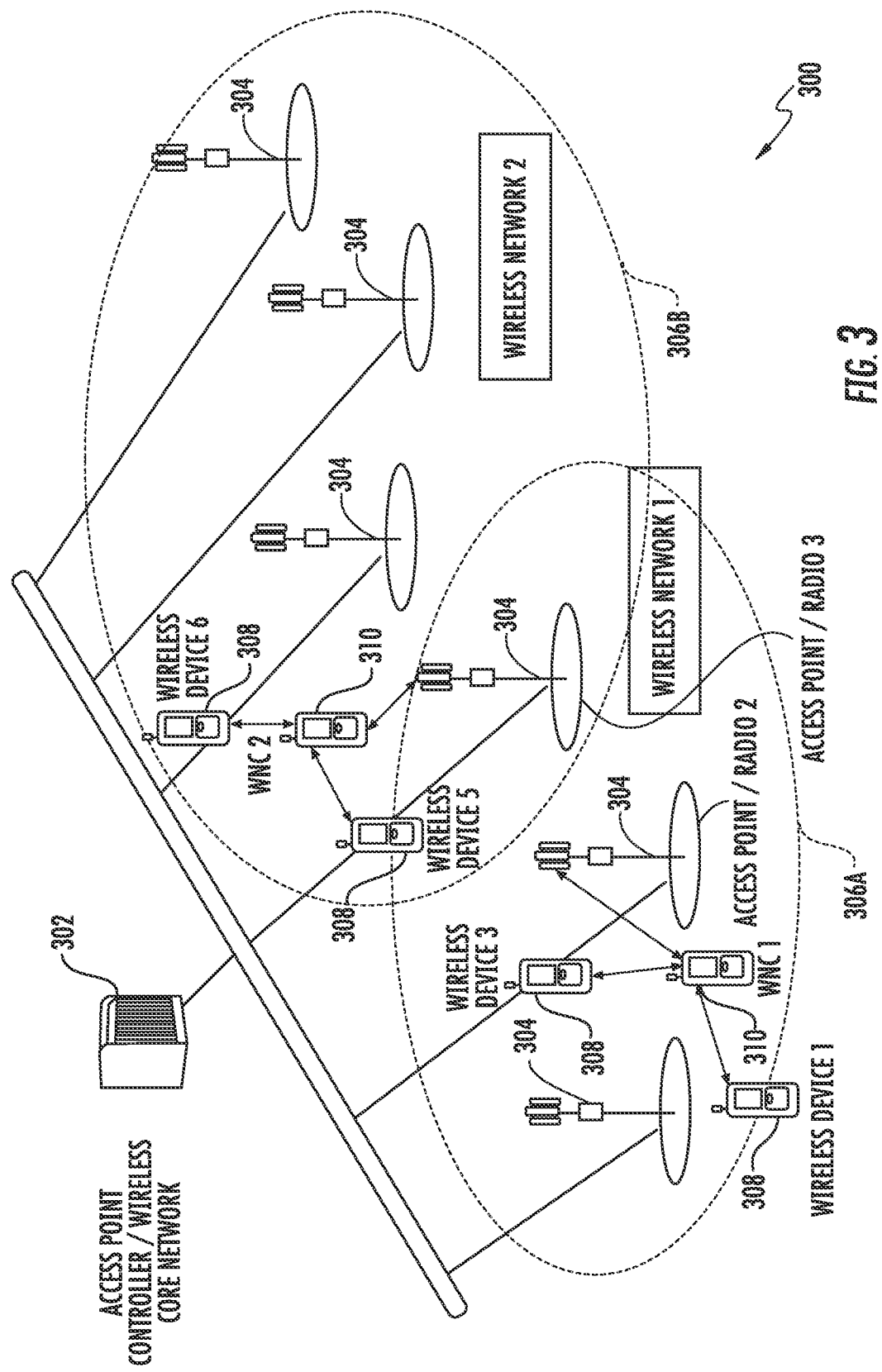
FIG. 3 is a functional block diagram illustrating one exemplary wireless network useful with various aspects of the present disclosure.

In contrast to the prior art wireless network of FIG. 2, FIG. 3 illustrates one exemplary wireless network 300 configured according to the various principles described herein. Similar to the prior art wireless network 200 of FIG. 2, the wireless network 300 of FIG. 3 includes an access point (AP) controller/wireless core network 302 that operates as a service node for a number of access points 304. Each of the access points 304 is configured to provide wireless network 306 coverage (wireless network 306A and wireless network 306B). However, as shown, certain wireless devices also operate as Wireless Network Clients (WNCs) 310. As used herein, the term "wireless client" refers generically to a wireless device operating as a client (as opposed to a host), and may include both legacy wireless devices and enabled WNCs.

Each WNC is configured to provide peer-to-peer subnetwork coverage. As used herein, a "peer-to-peer subnetwork" refers to each network provided by each corresponding WNC that is used to extend the wireless network coverage based on peer-to-peer communications. Such peer-to-peer communications may be direct (i.e., from one peer client device to another) or indirect (e.g., through an intermediary node or device, such as where a third peer or client acts as a "relay" for data sent from a first peer to a second peer).

In one exemplary embodiment, the combined coverage of the wireless networks and peer-to-peer sub-networks are configured to provision network access to e.g., a network provider's bearer network, switched networks, and/or packetized networks (as discussed supra). More generally, artisans of ordinary skill in the related arts will readily appreciate that the combined coverage of the wireless networks and peer-to-peer sub-networks may provide network access to any number of networks, including the Internet, corporate, home, and/or academic intranets, etc. Additionally, internal access within the total coverage area may also be provided (e.g., enabling two wireless clients to communicate with one another).

Several aspects of the Wireless Network Clients (WNCs) in the exemplary embodiment of FIG. 3 differ significantly from both legacy wireless device and access point (AP) operation. For example, a WNC may not have the same capabilities as a service node (e.g., transmission power, antenna gain, processing capability, access to network management entities, etc.). A WNC may also be required to simultaneously operate as both a client device via an existing connection to a service node, while simultaneously supporting either a peer-to-peer or client-to-host interface with another wireless device. Additionally, a WNC may be required to augment network management functionalities of the AP controller/wireless core network. A WNC may also act as a relay between two client devices as noted supra.

The following generalized discussions further illustrate operations that enable a WNC to host, exchange, and transfer data to/from other wireless client devices (so-called "foreign data") via its peer-to-peer sub-network.

Mobility Management—

Figure 4:
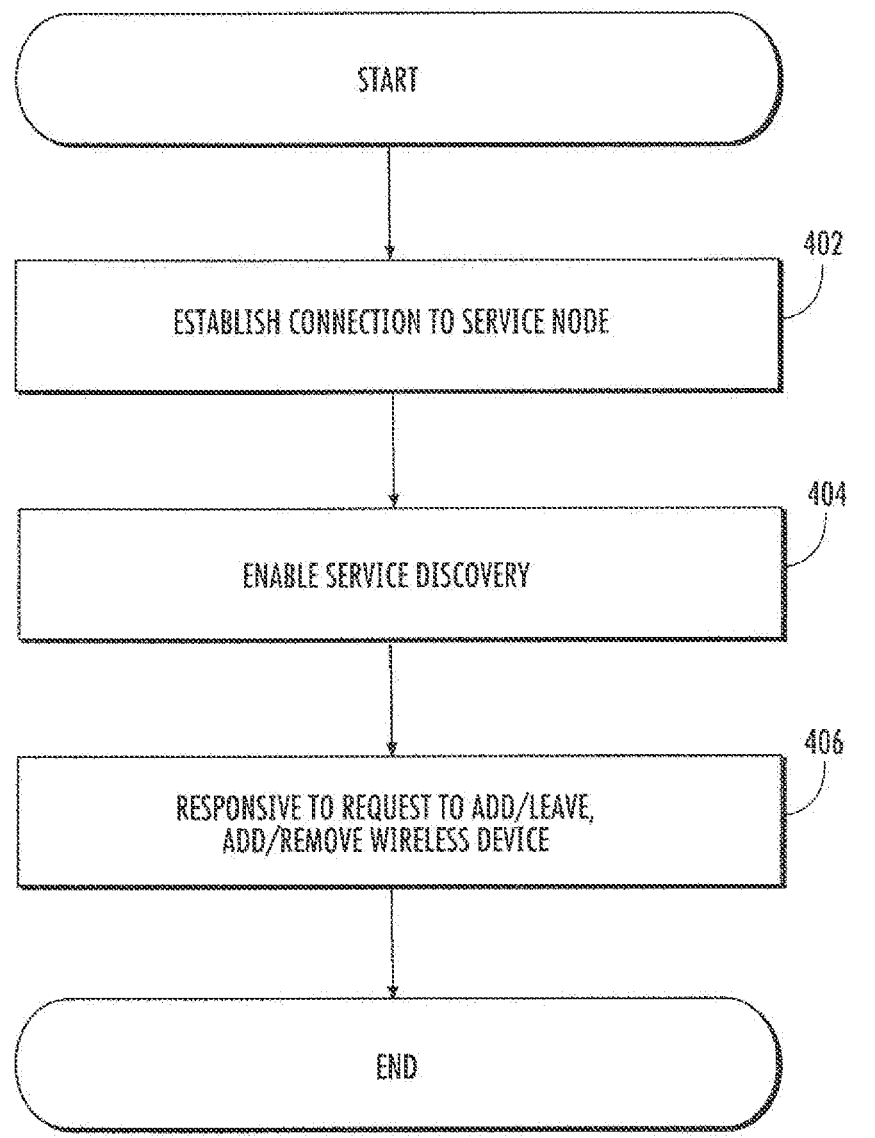
FIG. 4 is a logical flow diagram of one embodiment of a generalized method for mobility management of the wireless network useful with various aspects of the present disclosure.

FIG. 4 illustrates one embodiment of a generalized method 400 for a WNC to broadcast its presence and support handovers to/from the wireless network 300 of FIG. 3. At step 402 of the method 400, the WNC establishes a connection with one or more service node(s). In one embodiment, the WNC discovers the presence of service nodes based on one or more beacon signals via e.g., active searches, user input, etc. Once the WNC has discovered one or more available service nodes, the WNC may preferentially connect to a service node based at least in part on information included within the one or more beacon signals. Common examples of such information may include e.g., network identification, signal quality, supported modes of operation, network congestion, etc. In some embodiments, the WNC may connect to multiple service nodes so as to e.g., ensure the presence of at least one connection, access multiple different networks simultaneously, etc.

In one variant, the WNC may be configured to connect to a particular service node based at least in one or more predefined parameters. In some cases the predefined parameters may be set by the network provider, in other cases the predefined parameters may be set by the user (e.g., based on user preferences for billing, power consumption, etc.). In still other cases, the predetermined parameters may be internally managed by the device based on ongoing device considerations (e.g., processing burden, power management considerations, hardware/software compatibility, etc.).

In another such variant, the WNC may be instructed to connect to a particular service node by one or more higher level network management entities. As a brief aside, some network technologies are centrally managed and can instruct a device to "handover" between access points. For example, a device which is already connected to a first access point may be instructed to change to another access point by e.g., an AP controller/core network peer controller (PC) (described in greater detail hereinafter), or some other mobility management entity. See, e.g., the exemplary methodology of FIG. 4a, wherein the WNC first scans the local environment for eligible AP's (step 422), and associated with one AP meeting initial acceptance criteria such as sufficient RSSI, particular communications or link attributes, etc. (step 424). See the discussion of exemplary Wi-Fi beacons provided subsequently herein. At this point, the exemplary WNC may have no idea which of the "eligible" APs is designated by the network controller as the target AP. Per step 426, the WNC (e.g., using indigenous peer control entity software described in greater detail below) establishes logical communication with the network controller (via the AP's Wi-Fi link and the backend data connection between the AP and the controller), and is forwarded information from the controller relating to the desired (target) AP, which may then cause the WNC to disassociate with the original AP and re-associate with the target AP if/when available (step 428).

In other networking technologies, handovers are individually managed by each client device in conjunction with their AP; in such distributed network control schemes, the client device may actively inform the AP of handover possibilities and/or the AP may actively prune inactive client devices (assuming that device inactivity is due to reception loss).

The WNC may also be steered or associated with a given access point based on e.g., different services provided by that access point (e.g., higher available upstream bandwidth); see, e.g., the methods and apparatus described in co-owned U.S. patent application Ser. No. 14/959,885 filed on Dec. 4, 2015, entitled "APPARATUS AND METHODS FOR SELECTIVE DATA NETWORK ACCESS", and issued as U.S. Pat. No. 9,986,578 on May 29, 2018, previously incorporated herein, for exemplary approaches to such association.

As previously referenced, some variants may allow the WNC to augment the coverage area of multiple service nodes. For example, in one embodiment, the WNC may receive multiple signals from multiple different access points with different Service Set Identifiers (SSIDs). The WNC may connect via one or more of these service nodes, ostensibly providing a coverage area that bridges between the different access points. In such variants, the WNC may select which service nodes to connect, based on a multitude of considerations including, without limitation: the WNC's processing burden, the WNC's transceiver capabilities, the WNC's power consumption/remaining power, the link quality of each service node, the congestion of each service node, overarching network coverage considerations (e.g., based on data generated from a centralized or local network controller), etc.

Figure 4A:
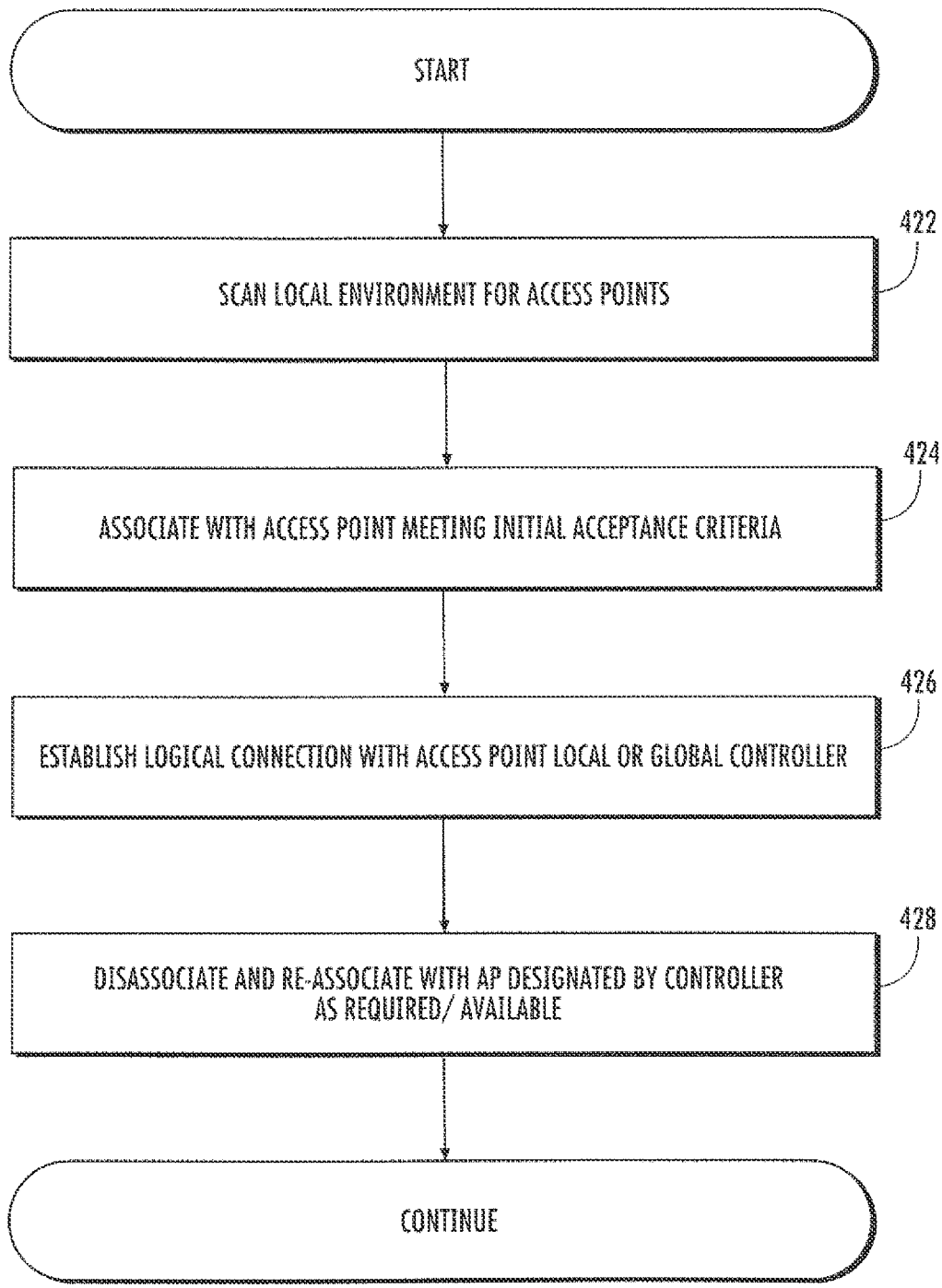
FIG. 4a is a logical flow diagram of one embodiment of a method for Wireless Network Client (WNC) association management according to the present disclosure.

In one embodiment of the architecture 400, the WNC includes a peer control entity (e.g., application or other software operative to run on the WNC) which registers with the AP controller/core network that manages the service node, such as via the method of FIG. 4a. Data communications between the WNC peer control entity and the AP controller occur via e.g., the interposed AP. In some cases, the peer control software has been previously downloaded and installed in the WNC, such as via an online "app store", MSO website, etc. In other embodiments, the peer control entity may be indigenous to the WNC at time of manufacture/deployment (whether as an application, or via software or firmware disposed lower in the protocol stack of the WNC).

In still other embodiments, the peer control entity software may be "pushed" (or "pulled") to wireless clients that the AP controller/core network believes could optimize its network coverage. For example, in push-type networks, an AP controller/core network entity (e.g., software application running on the controller) may monitor existing network coverage of its APs. APs that meet certain prescribed criteria; e.g., which have frequent coverage loss or regular bandwidth overflows, may benefit from having their coverage augmented by one or more peer-to-peer sub-networks. In such situations, the AP controller/core network can push the peer control entity software to one or more wireless clients (or a wireless client can pull the peer control entity software), so as to provide better coverage.

It will also be appreciated that the peer entity software can be disposed on the WNC (whether at time of manufacture, at time of registration with the MSO, or otherwise) and remain dormant until such need for augmented coverage arises. For instance, as part of an MSO subscription plan, subscribers of the MSO network may be asked to assent to having the "invisible" app or software loaded onto their wireless mobile device, the app configured to enable the provision of augmented WLAN coverage by the host WNC. The app may then remain dormant, and periodically wake the Wi-Fi or other interface of the WNC (if not active) to monitor for communications from an AP controller asking the WNC to act as a peer sub-network provider. When the Wi-Fi interface is active, the app can routinely monitor for such communications.

Referring back to step 402 of the method 400 of FIG. 4, each peer control entity is identified by a unique identifier to the AP controller/core network. Common examples of unique identifiers include, without limitation, a user email account (or other subscriber-specific account), account number, device-specific identifier (e.g., medium access control (MAC) ID, serial number etc.), software registration number (e.g., assigned during initial software installation, etc.), etc.

In one variant, registration with the AP controller/core network includes establishing a permanent or semi-permanent security association between the AP controller/core network and the WNC. In some implementations, the peer control entity is authenticated and/or authorized to operate as a WNC. As a brief aside, it is readily appreciated that the WNC may be configured to relay different types of data to prospective wireless clients (via the WNC's hosted peer-to-peer sub-network). Certain types of data associated with prospective wireless clients may be especially sensitive, whereas other types of data may not require privacy protection. Depending on usage, the WNC may or may not be subject to stronger (or weaker) security protocols. For example, in order to guarantee privacy of other wireless clients during clear text data transmissions (as may be required during initial service discovery) the WNC may be required to implement significant encryption such as AES or DES encryption. In contrast, if the WNC only augments existing coverage but does not support service discovery protocols, then the WNC can operate under reduced scrutiny, as it only supports data transmissions that are already encrypted at the session endpoints (e.g., between the wireless client and the end service or application).

In some cases, encryption may be performed as a portion of the authentication and/or authorization process (e.g., an encryption key may be the result of successful authentication, etc.) In still other cases, encryption may be preconfigured and enabled by default (e.g., existing secret keys are enabled with successful authentication, etc.). Still other systems may negotiate and/or re-negotiate keys as part of overarching security protocol. Artisans of ordinary skill will readily appreciate that symmetric encryption (private key encryption) or asymmetric encryption (public key encryption) schemes may be used with equal success in conjunction with the principles described herein.

In some embodiments, the AP controller/core network may actively disable WNC functionality (i.e., limiting the WNC to wireless client capabilities), or simply not "wake" the dormant WNC. More directly, WNC capabilities may not always be useful. For example, in network deployments with high WNC densities, the AP controller/core network may limit the number of WNCs so as to reduce unnecessary network overhead. As will be appreciated, the foregoing processes may be actively and dynamically implemented, depending on e.g., prevailing network conditions, WNC densities, AP densities in a given area, classes of users/subscribers within the coverage area, types of user equipment (e.g., prospective WNCs) within the coverage area, and so forth.

At step 404 of the method 400, the WNC broadcasts service discovery information via its peer-to-peer sub-network. In one exemplary embodiment, successful connection with the service node provides the WNC with information necessary to initialize its peer-to-peer sub-network consistent with its coverage network. For example, in the context of Wi-Fi, the WNC receives a variety of network parameters from its AP controller/core network including, without limitation: network identification (e.g., service set identifier (SSID), beacon intervals, time stamps, supported features (e.g., data rates) and other parameters, traffic indications, etc.).

In some cases, the WNC may dynamically arbitrate for resources. For example, within the context of Wi-Fi, a WNC may use existing Wi-Fi distributed coordination function (DCF) operation to share the wireless medium between multiple stations. DCF relies on carrier sense multiple access with collision avoidance (CSMA/CA) and optionally includes request to send/clear to send signaling (RTS/CTS) to share the wireless medium. In other schemes, the WNC may assigned specific resources for use (e.g., uplink and downlink frequencies, time slots, spreading codes, etc.) Generally, within the context of Wi-Fi, the beacon signal is transmitted within a dedicated time slot, whereas other data transmissions are dynamically arbitrated according to the aforementioned Wi-Fi DCF functionality.

In some embodiments, the WNC broadcasts one or more beacons that enable other wireless devices within its vicinity to discover the WNC. As discussed in greater detail elsewhere herein, wireless devices monitor for beacons, and regularly assess beacon signal strength in order to determine which access point (or WNC) can provide the best coverage. Unlike existing wireless network service nodes, an exemplary WNC broadcasts beacon information which includes information for their corresponding service node. In this manner, a wireless client that is attaching to an WNC's peer-to-peer sub-network need not reconfigure itself, rather it may continue using the association with its wireless network service node.

Figure 5:
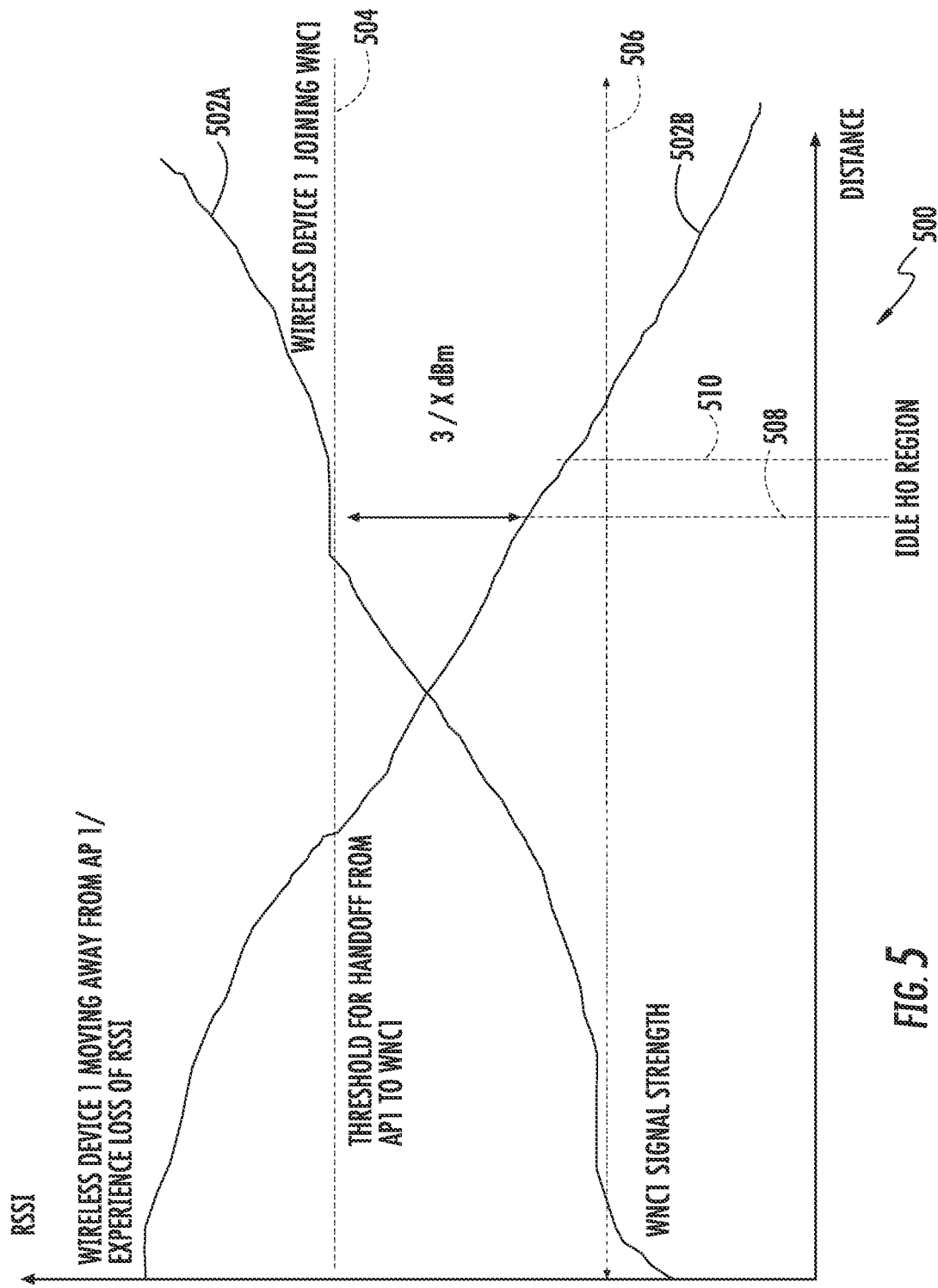
FIG. 5 is a graphical representation of the exemplary received signal strength indication (RSSI) that a wireless device observes as it moves away from an access point, toward a Wireless Network Client (WNC).

FIG. 5 illustrates one exemplary received signal strength indication (RSSI) that an inventive wireless device observes as it moves away from an access point, toward a WNC. As shown, the AP beacon's RSSI 502A diminishes as the wireless device moves away from the access point, whereas the WNC beacon's RSSI 502B increases as the wireless device moves toward the WNC. When the difference between RSSI 502A and RSSI 502B meets or exceeds one or more criteria (e.g., sufficiently high RSSI, sufficiently high RSSI sustained for a prescribed period of time, sufficiently low rate of change of RSSI, etc.) for handover 504 (e.g., 3 dBm (decibel-milliwatts)), the wireless device prepares for a handover, and suspends data communications until the handover has successfully completed (no communications occur within the handover region in the area between distances 508 and 510).

Also shown in FIG. 5 is an exemplary minimum reception threshold 506, which in one embodiment comprises the minimum amount of signal strength needed to sustain data communications. The minimum reception threshold 506 indicates for instance reception strength which is too attenuated to sustain reliable data delivery; a wireless device that cannot locate a replacement network before RSSI drops below the minimum reception threshold 506 will terminate the data connection in one implementation. Unlike suspension (described supra), termination results in a termination of the ongoing data session (i.e., subsequent data transfers will require a new data session).

While the aforementioned step 404 of FIG. 4 has been discussed within the context of beacon-based service discovery, artisans given the present disclosure will readily appreciate that a variety of other techniques may be used with equal success, without departing from the principles described herein. Common discovery techniques include, without limitation: pilot signal search, assisted discovery (e.g., via the AP controller/core network, etc.), out-of-band discovery services, use of alternate interfaces (e.g., Bluetooth) to initiate handshake or service connection, network registration services, etc.

It will be appreciated that while the foregoing exemplary operation contemplates received signal strength measurements such as RSSI, virtually any signal or link quality measure (or multiple measures used in tandem or in a confirmatory fashion) may be substituted with equivalent success. Other examples of link quality include, without limitation: received signal strength (RSS), signal-to-noise ratio (SNR), carrier-to-noise ratio (CNR), signal-to-interference plus noise ratio (SINR), carrier-to-interference plus noise ratio (CINR), bit error rate (BER), block error rate (BLER), packet error rate (PER), etc.

Still further, various other parameters of the foregoing may be adjusted (statically or dynamically) so as to optimize network management. For example, increasing the threshold for handoff 504 reduces the frequency of handovers, while decreasing the threshold for handoff 504 increases the frequency of handovers. Such adjustment may be particularly useful depending on the relative velocities of the WNC and/or the wireless client in consideration of network resources. Faster moving devices may enter/exit coverage quickly; however, each handover transaction can result in undesirable network overhead. Thus, increasing or decreasing minimum reception threshold 506 may allow a wireless client to conserve power (rather than continuing to use a fading link, etc.) or alternatively maximize link connectivity even under poor reception circumstances.

Moreover, while the aforementioned examples do not distinguish between peer-to-peer sub-networks and wireless networks, it is readily appreciated that certain implementations may have different parameters associated therewith; for instance, peer-to-peer sub-networks are limited by the physical capabilities of the WNC, thus the thresholds for handoff and minimum reception may require different performance relative to service provided from the overarching wireless network.

Referring back to FIG. 4, responsive to a request by a wireless device to join/leave the WNC's peer-to-peer sub-network, the WNC adds/removes the wireless device (step 406). In one exemplary embodiment, client additions/removals are managed by an access point (AP) controller/core network peer controller (PC); i.e., the wireless devices may be instructed to connect to a particular service node (either AP or WNC) by one or more higher level network management entities, such as discussed previously with respect to FIG. 4a. Alternatively, handovers may be individually managed by each service node (e.g., Wi-Fi AP) in conjunction with their client devices, etc. In still other embodiments, the wireless device itself is responsible for its own connectivity management, such as via use of the aforementioned indigenous software and/or firmware.

It will also be recognized that a given WNC may utilize partly or wholly different rules or policies regarding operation, association and/or peer sub-network establishment, depending on the identity or affiliation of the various APs at a given location. For instance, the WNC of an MSO subscriber may implement one or more of the foregoing policies whenever its initial and/or "target" APs (FIG. 4a) are each owned and operated by the MSO (such as may be determined by e.g., MAC address of the AP, SSID, advertisement of the AP as being MSO-associated, etc.), whereas when operating in a non-MSO network, such peer-to-peer sub-network capability is not utilized.

In one exemplary embodiment of the methodology of FIG. 4, a wireless device is "peered" to the peer-to-peer sub-network of the WNC. In other embodiments, the WNC hosts a small sub-network of the WNC. As used in the present context, "peer-to-peer" networking refers to any network topology where the peers are substantially equal participants in the network (e.g., the peers arbitrate amongst themselves equally for network resources). In contrast, "host" and/or "client" based networking refers to any network topology where the host controls one or more aspects of the client participation in the network (e.g., the host manages client access to network resources). It will be appreciated that various combinations of the foregoing may be used consistent with the present disclosure, such as where e.g., a given client is a peer to another client within a sub-network offered by a given WNC, the WNC hosted by an access point (AP).

It is noted that in some cases where a WNC is in a peer-to-peer arrangement with a client (e.g., user handset), then applications in such arrangement may be limited (i.e., limited to peer-to-peer messaging or the like, such as SMS/MMS). However, if the WNC is associated with an AP, then the WNC is effectively connected to the "outside world" through the AP and associated network connection, thereby expanding its application base.

Figure 6:
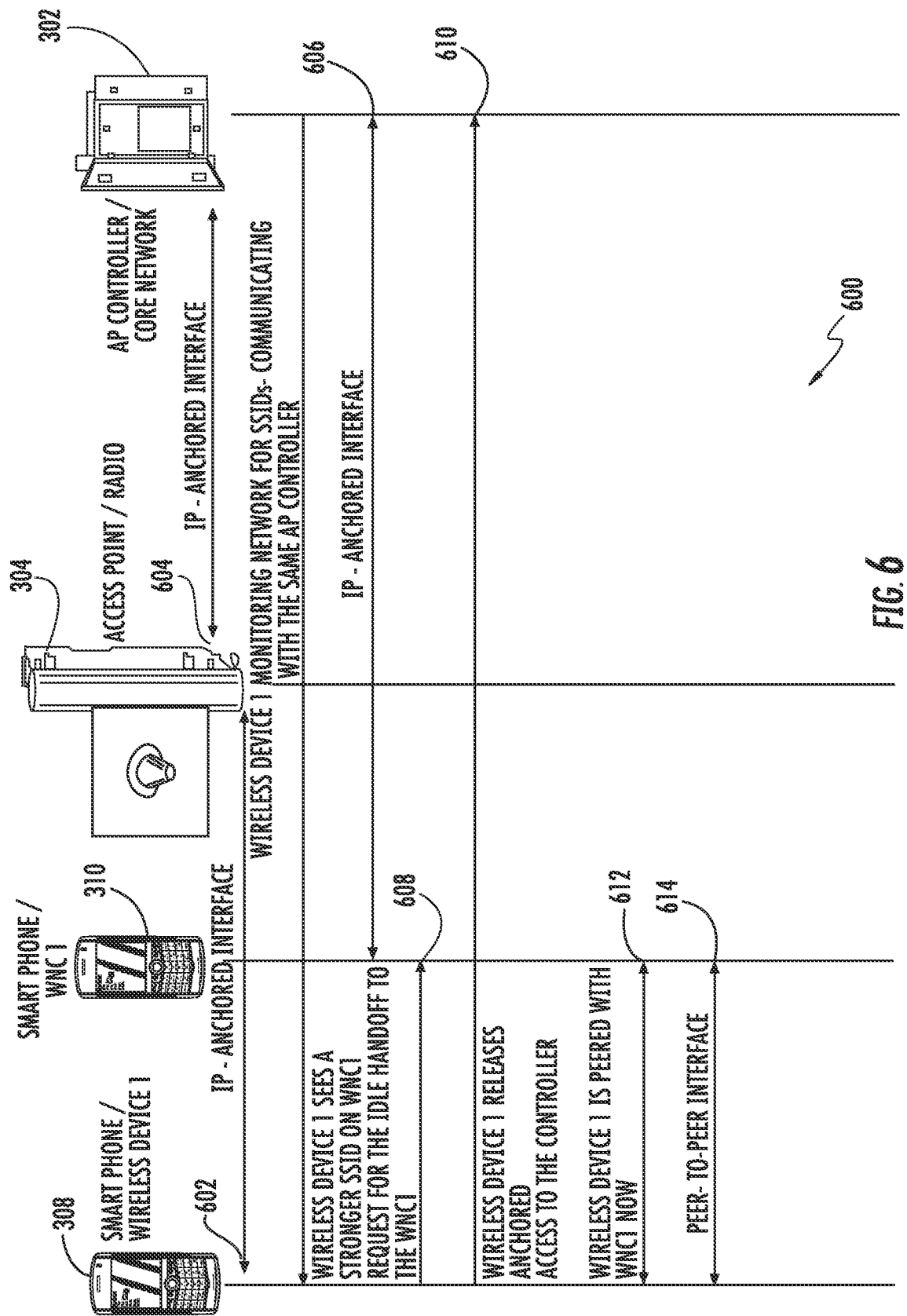
FIG. 6 is a software ladder diagram representation of one exemplary handover transaction according to the present disclosure.

FIG. 6 illustrates a logical software ladder diagram representation of one exemplary handover transaction according to the present disclosure. As shown, the wireless device 308 is in communication with an access point (AP) 304 via a first Internet Protocol (IP)-anchored interface 602; the AP is also in communication with the AP controller/core network 302 via a second IP-anchored interface 604. The WNC 310 also has a third IP-anchored interface 606 with the AP controller/core network 302. Each IP-anchored interface allows the two logical endpoints to transact control and data.

During normal operation, the exemplary (Wi-Fi enabled) wireless device 308 monitors the network for beacons with SSIDs corresponding to the AP controller 302, that have better signal quality (RSSI). When the wireless device 308 observes that the WNC 310 has a signal strength that exceeds the threshold for handoff, then the wireless device transmits a request for handoff 608 to the WNC 310. If the request for handoff is granted, then the wireless device transmits a release of the IP-anchored interface 602 to the AP controller 302 (step 610), and connects to the WNC 310 (step 612), to establish a peer-to-peer interface 614 which is piggybacked onto the WNC's peer-to-peer sub-network IP-anchored interface 606. In other implementations (not shown), the peer-to-peer interface 614 may be substituted with an IP-anchored interface with equal success.

In some variants, handover procedures include updating registration information within the new service node and/or the AP controller/core network. For example, in some cases, registration with the service node or the AP controller/core network may enable the wireless device to sustain an ongoing user profile and/or historic record of transactions (which may be useful for accounting, billing, etc.). Profile management may be useful so as to, inter alia, reduce messaging overhead and enable session persistence (e.g., reduce re-negotiation of cryptographic keys, etc.), such as where a given client "hops" (for whatever reason) between one or more WNCs and/or APs within a given coverage area or network.

In some variants of the foregoing, a wireless device can migrate a data session (including encryption keys, etc.) from a first service node to a second service node. Simple variants may update current session information with the new routing path (e.g., adding and/or removing service nodes from the routing path, etc.). More complex embodiments may allow for re-transmission, and/or duplicative transmission of packets, etc. thereby enabling fluid data migration that is transparent to higher layer software applications. In one such implementation, the AP controller/core network can provide the appropriate persistence information from the first service node to the second service node.

Data Link Management-

Figure 7:
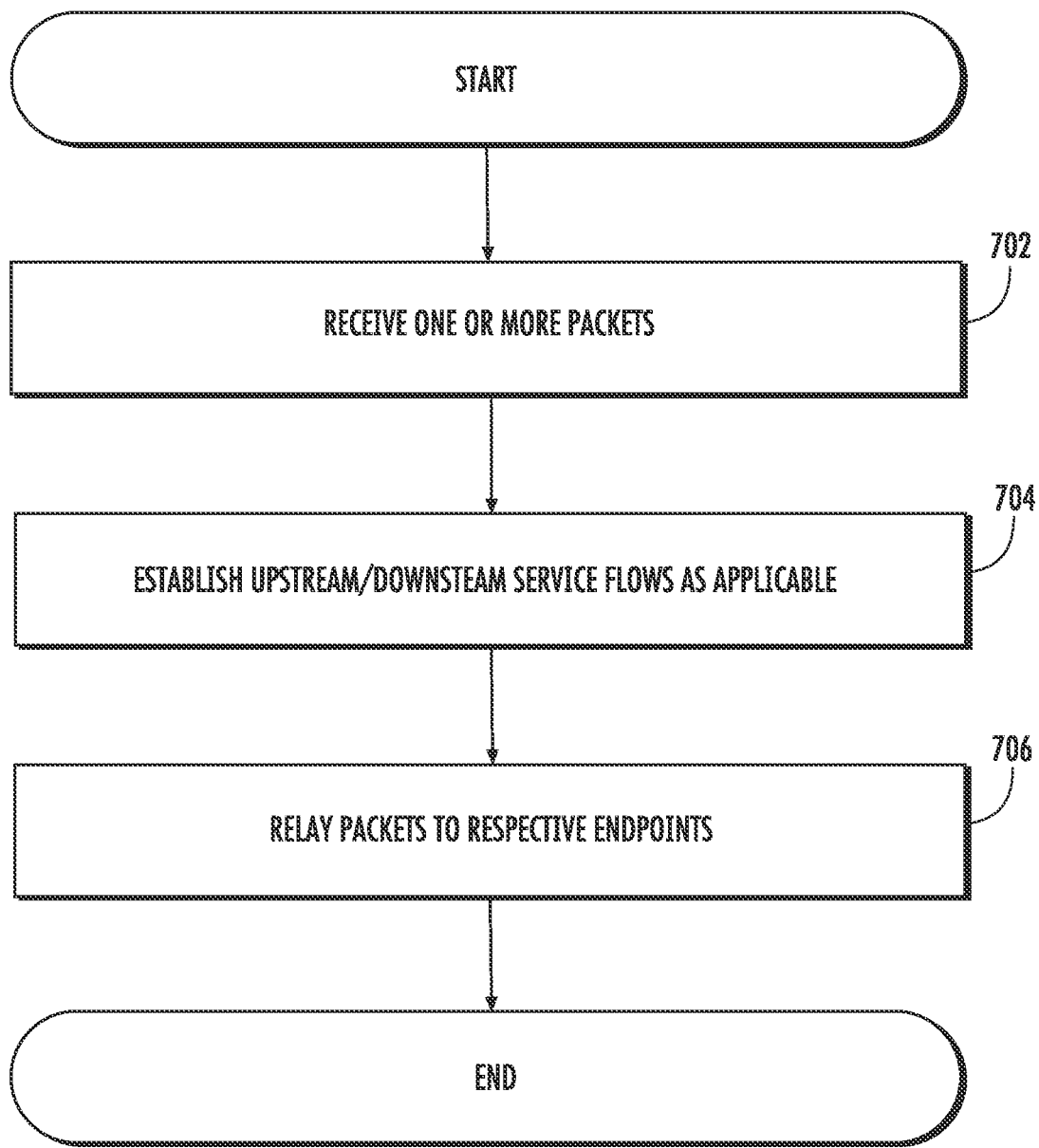
FIG. 7 is a logical flow diagram of one embodiment of a generalized method for transacting data via a peer-to-peer sub-network according to the present disclosure.

FIG. 7 illustrates one generalized method 700 for transacting data via the peer-to-peer sub-network coverage provided by the WNC. In one embodiment, the peer-to-peer sub-network is configured to transact one or more network address packets with other networked devices according to a network protocol. As is commonly implemented within the related arts, network addressing provides each node of a network with an address that is unique to that network; the address can be used to communicate (directly, or indirectly via a series of "hops") with the corresponding device. Common examples of Open Systems Interconnection (OSI) based network routing protocols include for example: Internet Protocol (IP), Internetwork Packet Exchange (IPX), and OSI based network technologies (e.g., Asynchronous Transfer Mode (ATM), Synchronous Optical Networking (SONET), Synchronous Digital Hierarchy (SDH), Frame Relay, etc.). Those of ordinary skill in the related arts will readily appreciate that the principles described herein be used with equal success in circuit switched networks, and/or hybridized variants thereof.

At step 702 of the method 700, the WNC receives one or more first data packets via its downstream peer-to-peer sub-network, and/or one or more second data packets via its upstream wireless network. The data packets may request one or more services or content from a plurality of content sources which are accessible via e.g., the Internet, or be one or more content that a wireless device seeks to upload to the Internet. Common examples of content sources include e.g., web servers, content servers, file servers, etc. Common examples of content may include without limitation e.g., Standard Definition (SD) content, High Definition (HD) content, Video-on-Demand (VOD) content, Switched Digital Video content, and High Speed Data (e.g., DOCSIS). More generally, content sources broadly include any source of digital data such as for example a third party data source, mass storage devices (e.g., RAID system), file servers, etc.

In one exemplary embodiment, the peer-to-peer sub-network of the WNC shares the same resources between the WNC and the wireless client. For example, the uplink and downlink must arbitrate over the same bandwidth according to e.g., time slots. Thus, increasing the uplink transactions decreases downlink resources available for transactions (and vice versa). Additionally, regardless of whether the wireless client or the WNC transmits or receives data, they share the same bandwidth (i.e., in CSMA/CA, the WNC and the wireless client arbitrate for exclusive access of the medium). Accordingly, in some cases, it may be better from a network resource utilization and/or interference standpoint for a WNC to relay wireless client data, than for the wireless client to transmit the data itself.

During data transactions, a WNC establishes a first service flow with a first secured data stream for data exchange between the WNC and a wireless client (step 704). Additionally, a second service flow with a second secured data stream is established between the WNC and the service node of the WNC. As used in the present context, the term "service node" refers generally and without limitation to the logical entity providing network services, and may include access points, gateways, other WNCs, and/or other relay entities, etc. Functionally, each WNC can host and transfer bi-directional data that is non-local (i.e., foreign) to the wireless device to its downstream (or "southbound") peers as well as its upstream (or "northbound") service node that is connected to the backhaul network In one embodiment, the upstream and downstream connectivity is performed according to a Time Division Multiple Access (TDMA) scheme. Other multiple access schemes include for example Frequency Division Multiple Access (FDMA), Orthogonal Frequency Division Multiple Access (OFDMA), Code Division Multiple Access (CDMA), etc. Certain system design considerations may require the flexibility of packet-switched delivery, or alternately, the bandwidth guarantees of circuit-switched delivery. Additionally, network content delivery may further include capabilities and support for Quality-of-Service (QoS) parameters. QoS parameters support resource reservation control mechanisms and may, inter alia, provide different priorities to different content data, or guarantee a minimum delivery rate.

At step 706 of the method 700, the WNC relays the packets to their respective upstream and downstream endpoints.

In one aspect, the WNC may consider its own limitations, the requested service of its attached wireless clients, and/or network considerations as part of the foregoing operations. As a brief aside, within the context of wireless consumer products, increased data transmission directly corresponds to an increase in processing burden and power consumption. For example, transmitting larger blocks of data requires more computational power and longer transmission times. Accordingly, the WNC supports wireless client transmissions at some non-trivial cost to the WNC's operator (i.e., reducing available battery power, and processing for other user-centric tasks). For instance, when the WNC is running low on battery, it may decline to support further data requests from its wireless clients. Similarly, if the WNC's user opens a processing intensive application, the WNC may preferentially service its own user before accommodating the requests of its connected wireless devices. These features may be implemented on the WNC using, e.g., the aforementioned application software/firmware, or may even hand off such management (at least in part) to a network entity such as the AP controller.

Figure 8:
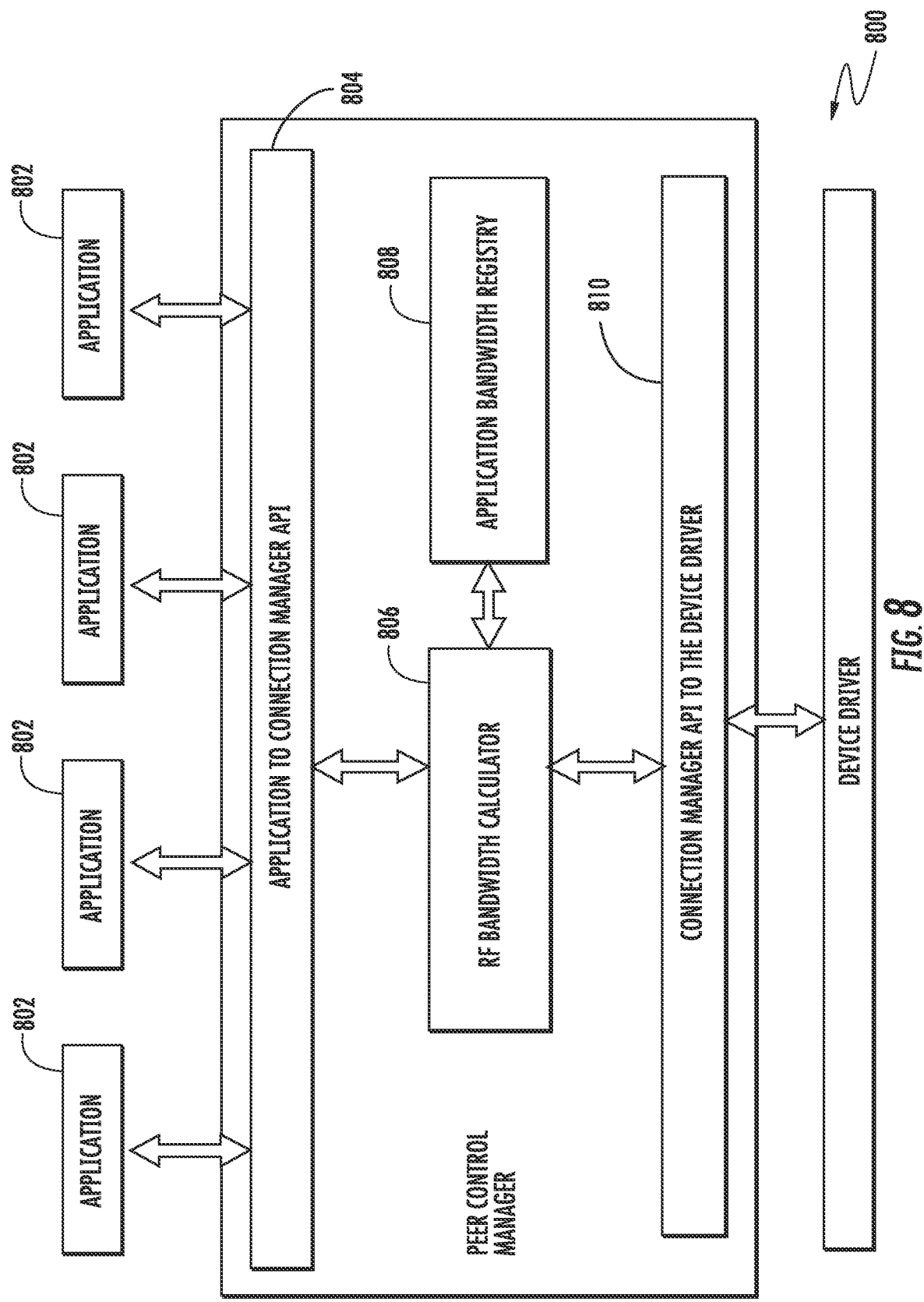
FIG. 8 is a functional block diagram of one embodiment of a Wireless Network Client (WNC) system architecture configured to manage data link operation.

FIG. 8 illustrates one exemplary WNC system architecture 800 configured to manage data link operation. As shown, a number of software applications 802 connect to a Peer Control Manager (PCM) via an Application to Connection Manager application programming interface (API) 804. The exemplary PCM includes an RF bandwidth calculator 806, and an application bandwidth registry 808. The PCM determines the portion of bandwidth allotted to each of the data streams that correspond to the software applications 802, to produce an aggregated input/output stream that is provided to the device driver via a Connection Manager API 810.

As used herein, the term "application programming interface (API)" refers generally and without limitation to one or more routines, protocols, tools, and/or other software or data constructs useful for interacting with a software entity. Typically, the API provides a virtualized interface that enables software to interface with other software, firmware, and/or hardware components.

In one embodiment, the RF bandwidth calculator 806 is configured to queue data packets that the WNC receives from either the wireless network or the peer-to-peer subnetwork. Artisans of ordinary skill in the related arts will readily appreciate, given the present disclosure, that bandwidth for each application 802 can be represented as the amount of data queued (i.e., determined based on the stored data packets) as a function of collection time. More sophisticated variants may additionally track historical bandwidth use (e.g., based on typical software application loads), predicted bandwidth use (e.g., based on QoS requests, etc.), and/or network congestion, etc.

In one embodiment, the application bandwidth registry 808 is configured to store and/or manage one or more application bandwidth requirements. Simple embodiments may comprise a data structure that associates each active application 802 with a corresponding bandwidth allocation. More complicated variants of the application bandwidth registry 808 may, for instance, dynamically increase and or decrease bandwidth for active applications 802 based on e.g., current usage, historical usage, current network capacity, predicted network capacities, WNC capabilities, etc. In some cases, the application bandwidth registry 808 may additionally store inactive application requirements and/or usage statistics so as to expedite activation of the inactive applications, and/or for use with historic performance metrics, etc.

During operation, the exemplary implementation of the RF bandwidth calculator 806 determines (such as via consultation of the application bandwidth registry 808) the bandwidth allocations for the applications 802. For example, in network scenarios where there are bandwidth constraints, the PCM may determine that certain ones of the applications 802 should be prioritized over other applications, such as e.g., where that application must maintain certain QoS requirements. In one such scenario, the PCM may be notified of an impending network connectivity loss (e.g., handover) and may prepare to suspend its connections gracefully, and/or prioritize each application with active data transfers. In another such scenario, the WNC may have limited device resources (e.g., power, processing, etc.); consequently, the PCM may preferentially service the requirements of its own subscriber before relaying the services of connected wireless clients.

In some embodiments, the PCM may consider other incentives and/or disincentives in prioritizing operation. For example, the network may seek to compensate the WNC user for additional coverage provided by WNC operation. This compensation may be monetary e.g., in the form of billing rebates, promotion codes, reduced service fees, etc. In other situations, the compensation may be service related; e.g., preferential or "head-of-the-line" service, and/or unlocking desirable device features, etc. For example, the ability to use the additional coverage area provided by WNCs may be predicated on enabling WNC functionality in the user's own device. In related variants, users may be able to purchase special data plans that enable their wireless clients to connect to WNCs, and/or to prevent their device from operating as a WNC.

It is appreciated that in some circumstances, network providers may have the ability to force a wireless device into operating as an WNC to extending coverage. For example, service in certain rural areas (or areas of low coverage) may require (e.g., as a condition of service for a given user) that the user permits the network provider to "piggyback" coverage for one or more other users. In other examples, certain use scenarios may demand enhanced coverage capabilities (e.g., in the event of emergency, and/or to assist in natural disaster recovery efforts, etc.).

Various other schemes for enabling/disabling WNC sharing will be readily appreciated by those of ordinary skill in the related arts, given the contents of the present disclosure.

Wireless Network Client (WNC) Apparatus-

Figure 9:
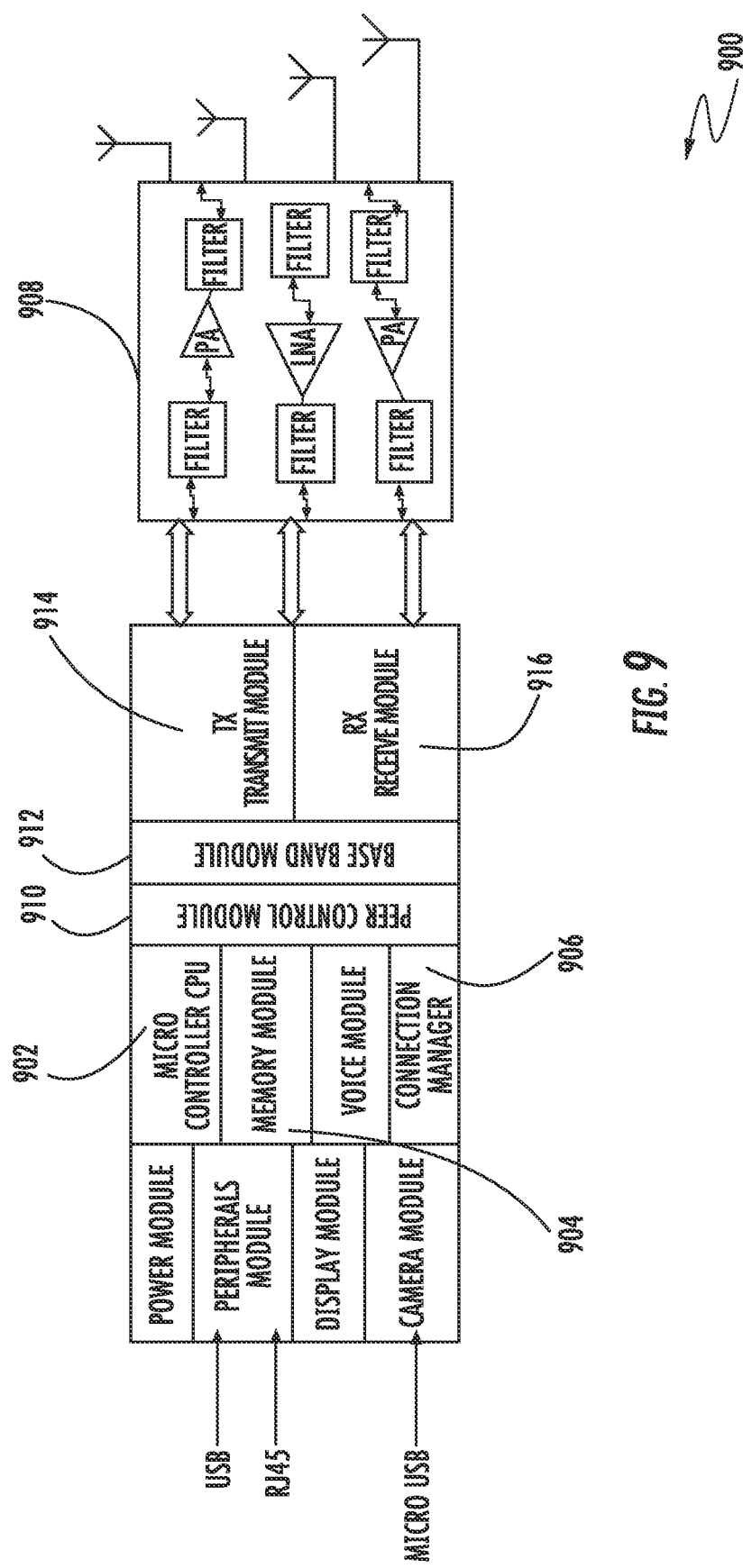
FIG. 9 is a functional block diagram of one embodiment of a Wireless Network Client (WNC) apparatus according to the present disclosure.

FIG. 9 illustrates one exemplary Wireless Network Client (WNC) according to the present disclosure. As shown, the WNC includes: a processor subsystem 902, a memory module 904, connection manager 906, a radio frequency interface 908, a peer control module 910, a baseband control module 912, a transmit module 914, and a receive module 916.

In one exemplary embodiment, the processor 902 may include one or more of a digital signal processor, microprocessor, field-programmable gate array, or plurality of processing components mounted on one or more substrates. The processor subsystem 902 may also comprise an internal cache memory. The processor subsystem is in communication with a memory subsystem 904, the latter including memory which may for example comprise SRAM, flash, and/or SDRAM components. The memory subsystem may implement one or more of DMA-type hardware, so as to facilitate data accesses as is well known in the art. The memory subsystem of the exemplary embodiment contains computer-executable instructions which are executable by the processor subsystem.

The processor subsystem 902 is configured to execute at least one computer program stored in memory 904 (e.g., non-transitory computer readable storage media). The computer program may include a plurality of computer readable instructions configured to perform peer control management. In other embodiments, the "Peer Control Manager" (PCM) 910 is a dedicated hardware module that is separate from the processor 902, in still other embodiments the PCM 910 is a software program that is virtualized within another processor (e.g., a co-processor (not shown), etc.).

In one embodiment, the connection manager 906 utilizes a dedicated hardware module that is separate from the PCM 910; in other embodiments, the connection manager 906 is a software program executed in conjunction or in concert with the PCM 910. A wireless client device may further incorporate hardware enhancements (referred to herein as a "Peer Module" (PM)) to support WNC operation and/or avoid hardware limitations on the WNC operation. Wireless clients that operate as a WNC with only PCM software/firmware and wireless clients with both PCM software/firmware and PM hardware enhancements are envisioned.

In one embodiment, the radio frequency interface 908 is configured to transact one or more network address packets with other networked devices according to a network protocol. As previously noted, network addressing provides each node of a network with an address that is unique to that network; the address can be used to communicate (directly via peer-to-peer communications, or indirectly via a series of "hops") with the corresponding device. In more complex networks, multiple layers of indirection may be used to assist in address exhaustion (e.g., one address is logically divided into another range of network addresses, etc.). Common examples of Open Systems Interconnection (OSI) based network routing protocols include for example: Internet Protocol (IP), Internetwork Packet Exchange (IPX), and OSI based network technologies (e.g., Asynchronous Transfer Mode (ATM), Synchronous Optical Networking (SONET), Synchronous Digital Hierarchy (SDH), Frame Relay, etc.).

Referring now to the PCM 910 of FIG. 9, one implementation of the PCM 910 is configured to: (i) register with a service node and/or access point (AP) controller/core network; (ii) enable service discovery for wireless clients based on network information; and (iii) establish a peer-to-peer sub-network with wireless clients. In one exemplary embodiment, registration of the PCM 910 includes contacting a complementary peer controller (PC) service provided by the AP controller/core network. As described in greater detail elsewhere herein, the PC service is configured to authenticate and authorize the WNC. On successful authorization, the WNC may be enabled/instructed to provision WNC functionality for its neighboring wireless clients. In one variant, the WNC provisions network service in accordance with information provided by the PC. For example, the PC may specify which SSIDs the WNC can bridge. In another example, the PC may instruct the WNC to operate a completely independent sub-network (with a unique SSID), etc.

As will be readily appreciated by those of ordinary skill in the related arts, the PCM may provide network service by e.g., providing network identification, managing network congestion, managing capabilities supported by the wireless network, etc. For example, the PCM may communicate with wireless clients, and/or enable/disable WNC functionality to intelligently manage its peer-to-peer sub-network coverage.

In another aspect, the connection manager 906 is configured to manage and relay packets from a peer-to-peer sub-network to a wireless network, and vice versa. In one exemplary embodiment, the connection manager 906 operates as a service access node (SAN) to other wireless clients in the same network. A SAN has both peer-to-peer communications capabilities (to communicate with wireless clients) and gateway functionality (to aggregate data traffic over its own uplink communications). As used in the present context, the term "gateway" refers without limitation to any network node that is configured to bridge data transactions between networks that use e.g., different protocols, addressing schemes, etc. Within the context of the exemplary WNC, the PCM operates as a gateway between peer-to-peer messaging (with its downstream wireless client(s)) and wireless network messaging (to the upstream AP). Other examples of gateway functionality may require, without limitation: protocol translation, network address translation, rate conversion, firewall capabilities, rate buffering, etc.

For example, for each wireless client, an exemplary WNC SAN may collect data packets from the peer-to-peer sub-network and arbitrate for access to the wireless network. Once access to the wireless network is granted, the WNC SAN performs network address translation and transmits the data packets according to guaranteed quality of service (QoS) requirements. Additionally, while connected to the AP the WNC SAN can receive packets destined for the wireless client. Thereafter, the WNC SAN can relay the downstream packets to the wireless client via the peer-to-peer network.

The radio/modem subsystem of the device 900 of FIG. 9 comprises a digital baseband 912, TX Transmit Module 914 and RX Receive Module 916. The apparatus 900 further comprises a radio frequency interface 908 that generally incorporates an assembly of filters, low noise amplifiers (LNAs), power amplifiers (PAs), and antenna assemblies that are configured to transmit a modulated waveform via an air interface. As shown, the radio/modem subsystem may be configured to support MIMO (Multiple Input Multiple Output) antenna technology in which multiple antennas are used to transmit and receive signaling. With MIMO, multiple independent data streams can be transmitted in parallel using the same time-frequency resource. To distinguish the data streams sharing this same time-frequency resource, spatial division multiplexing is applied. Those of ordinary skill in the related arts will readily appreciate that SISO (Single In, Single Out), SIMO (Single In, Multiple Out), and MISO (Multiple In, Single Out) antenna schemes may be substituted with equivalent success.

The present disclosure is primarily directed to consumer electronics devices, such as, but not limited to: set-top boxes (e.g., DSTBs), gateways, modems, personal computers (PCs), and minicomputers, whether desktop, laptop, or otherwise, and mobile devices such as handheld computers, PDAs, personal media devices (PMDs), tablets, "phablets", and smartphones. Artisans of ordinary skill will readily appreciate that consumer electronics devices may incorporate various other assorted components necessary to support functions, such as: power modules, peripherals modules, display modules, camera modules, voice codec modules, etc.

Access Point Controller/Core Network Apparatus-

Figure 10:
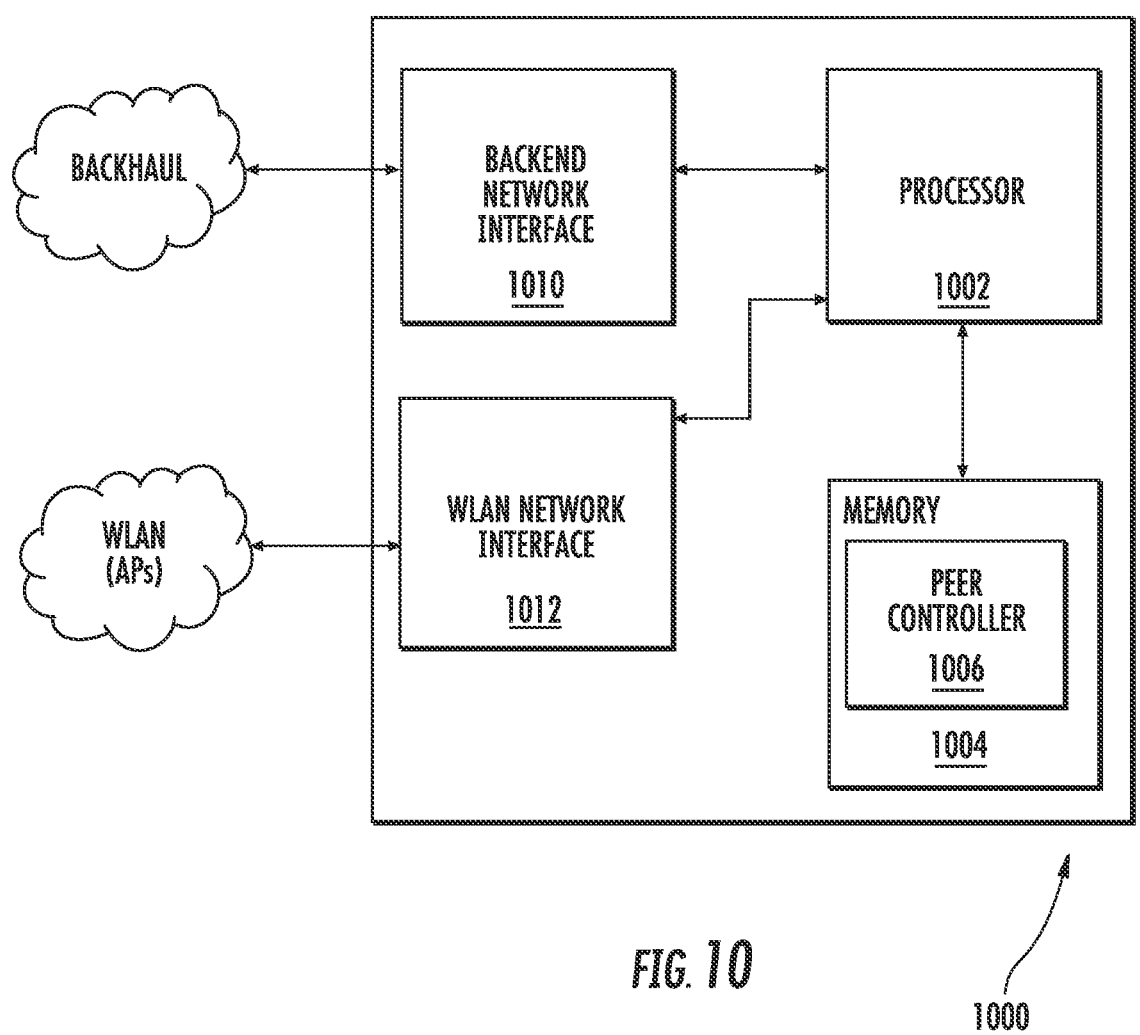
FIG. 10 is a functional block diagram of one embodiment of an Access Point (AP) Controller/Core Network Peer Connection Manager (PCM) apparatus according to the present disclosure.

FIG. 10 illustrates one exemplary Access Point (AP) Controller/Core Network Peer Connection Manager (PCM) 1000 according to the present disclosure. As shown, the AP controller includes: a processor 1002, a memory module 1004, a peer controller (PC) 1006, a backend (e.g., backhaul) network interface 1010, and a WLAN interface 1012. Artisans of ordinary skill in the related arts will readily appreciate, given the present disclosure, that the AP Controller/Core Network PC may be virtualized and/or distributed within other core network entities, the foregoing apparatus being purely illustrative. Moreover, in deployment scenarios where an access point operates in a stand-alone manner without an overarching network of access points (e.g., consumer premises may only have a single AP, etc.), it is readily appreciated that a single AP may execute the complementary PC 1006.

In one exemplary embodiment, the processor 1002 may include one or more of a digital signal processor, microprocessor, field-programmable gate array, or plurality of processing components mounted on one or more substrates. The processor 1002 may also comprise an internal cache memory. The processing subsystem is in communication with a memory subsystem 1004, the latter including memory which may for example comprise SRAM, flash, and/or SDRAM components. The memory subsystem may implement one or more of DMA type hardware, so as to facilitate data accesses as is well known in the art. The memory subsystem of the exemplary embodiment contains computer-executable instructions which are executable by the processor subsystem.

The processing apparatus 1002 is configured to execute at least one computer program stored in memory 1004 (e.g., non-transitory computer readable storage media). The computer program may include a plurality of computer readable instructions configured to perform the complementary logical functions of a peer controller (PC) 1006. Other embodiments may implement such functionality within dedicated hardware, logic, and/or specialized co-processors (not shown). For instance, the peer controller (or portions of the functionality thereof) can be located in one or more MSO data centers, and/or in other "cloud" entities (whether within our outside of the MSO network).

In one embodiment, the complementary PC 1006 is configured to register wireless clients and wireless network clients (WNCs), and centrally control the broader wireless network (and constituent peer-to-peer sub-networks). Common examples of configuration include: providing network identification, managing network congestion, managing capabilities supported by the wireless network, etc. For example, the complementary PC 1006 may communicate with WNCs executing PCM clients, and/or enable/disable such PCM clients to intelligently manage the overall coverage provided by the wireless network and peer-to-peer sub-network coverage. In some variants, the PC 1006 may be configured to push (or respond to pull requests) for WNC clients so as to augment and/or enhance its coverage area.

In one embodiment, the complementary PC 1006 is further configured to communicate with one or more authentication, authorization, and accounting (AAA) servers of the core network. The AAA servers are configured to provide, inter alia, authorization services and facilitate tracking and/or control of network subscribers for intelligently controlling access to computer resources, enforcing policies, auditing usage, and providing the information necessary to bill for services.

In some variants, authentication processes are configured to identify a subscriber, typically by having the subscriber enter a valid user name and valid password before access is granted. The process of authentication may be based on each subscriber having a unique set of criteria or credentials (e.g., unique user name and password, challenge questions, entry of biometric data, entry of "human" verification data such as "Captcha" data, etc.) for gaining access to the network. For example, the AAA servers may compare a user's authentication credentials with user credentials stored in a database. If the authentication credentials match the stored credentials, the user may then be granted access to the network. If the credentials are at variance, authentication fails and network access may be denied.

Following authentication, the AAA servers are configured to grant a subscriber authorization for certain features, functions, and/or doing certain tasks. After logging into a system, for instance, the subscriber may try to issue commands. The authorization process determines whether the user has the authority to issue such commands. Simply put, authorization is the process of enforcing policies: determining what types or qualities of activities, resources, or services a user is permitted. Usually, authorization occurs within the context of authentication. Once a user is authenticated, they may be authorized for different types of access or activity. A given user may also have different types, sets, or levels of authorization, depending on any number of aspects. For instance, a given subscriber may be authorized to: operate as a wireless network client (WNC), access a WNC, prevent other subscribers from requesting WNC based access, etc.

The AAA servers may be further configured for accounting, which measures the resources a user consumes during access. This may include the amount of system time or the amount of data a user has sent and/or received during a session, somewhat akin to cellular data plans based on so many consumed or available Gb of data. Accounting may be carried out by logging of session statistics and usage information, and is used for, inter alia, authorization control, billing, trend analysis, resource utilization, and capacity planning activities. It will be appreciated that in other examples, one or more AAA servers can be located at the regional data center, and may be linked to a third-party or proxy server, such as that of an event management entity.

Accounting information may be used to compensate subscribers for their WNC operation, and/or WNC resource consumption. As previously noted, compensation may be monetary e.g., in the form of billing rebates, promotions, reduced service fees, etc. In other situations, the compensation may be service related i.e., preferential service, and/or unlocking desirable device features, etc.

In one embodiment, the backend network interface 1010 is configured to transact one or more network address packets with other networked devices according to a network protocol. Common examples of Open Systems Interconnection (OSI) based network routing protocols include for example: Internet Protocol (IP), Internetwork Packet Exchange (IPX), and OSI based network technologies (e.g., Asynchronous Transfer Mode (ATM), Synchronous Optical Networking (SONET), Synchronous Digital Hierarchy (SDH), Frame Relay, etc.) The network interface 1010 operates in signal communication with the backbone of the content delivery network (CDN), such as that of FIGS. 1-1d. These interfaces might comprise for instance GbE (Gigabit Ethernet) or other interfaces of suitable bandwidth capability.

The WLAN interface 1012 is utilized in the illustrated embodiment for communication with the WLN APs, such as via Ethernet or other data network protocols. It will also be appreciated that the two interfaces 1010, 1012 may be aggregated together, and/or shared with other extant data interfaces, such as in cases where the controller entity function is virtualized within another component, such as an MSO network server performing other functions.

It will be recognized that while certain aspects of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure disclosed and claimed herein.

While the above detailed description has shown, described, and pointed out novel features of the disclosure as applied to various embodiments, it will be understood that various omissions, substitutions, and changes in the form and details of the device or process illustrated may be made by those skilled in the art without departing from the disclosure. This description is in no way meant to be limiting, but rather should be taken as illustrative of the general principles of the disclosure. The scope of the disclosure should be determined with reference to the claims.

It will be further appreciated that while certain steps and aspects of the various methods and apparatus described herein may be performed by a human being, the disclosed aspects and individual methods and apparatus are generally computerized/computer-implemented. Computerized apparatus and methods are necessary to fully implement these aspects for any number of reasons including, without limitation, commercial viability, practicality, and even feasibility (i.e., certain steps/processes simply cannot be performed by a human being in any viable fashion).

What is claimed is:

1. A computerized method of operating a wireless network, comprising:
   establishing, via a computerized network client device, a data connection with a service node apparatus of the wireless network;
   transmitting, from the computerized network client device, service discovery information to enable service discovery via a peer-to-peer sub-network, the transmitting comprising causing the computerized network client device to transmit one or more data beacons within a dedicated time slot, the one or more data beacons comprising data advertising the computerized network client device as an available access point; and
   based at least on data representative of a request for a peer-enabled computerized wireless device to join or leave the peer-to-peer sub-network, causing the peer-enabled computerized wireless device to be added to or removed, respectively, from the peer-to-peer sub-network.

2. The computerized method of claim 1, wherein the establishing of the data connection with the service node apparatus comprises establishing wireless upstream connectivity according to a Time Division Multiple Access (TDMA) scheme.

3. The computerized method of claim 1, wherein the causing of the peer-enabled computerized wireless device to be added to or removed from the peer-to-peer sub-network comprises causing an access point controller apparatus to either (i) disassociate the peer-enabled computerized wireless device from the computerized network client device and associate the peer-enabled computerized wireless device with an access point apparatus, or (ii) associate the peer-enabled computerized wireless device with the computerized network client device and disassociate the peer-enabled computerized wireless device from the access point apparatus.

4. The computerized method of claim 1, wherein the establishing of the data connection with the service node apparatus of the wireless network comprises causing migration of a data session from a first service node apparatus to a second service node apparatus, the migration comprising removing the first service node apparatus from a routing path and adding the second service node apparatus to the routing path.

5. The computerized method of claim 1, wherein the peer-to-peer sub-network comprises a downstream peer-to-peer sub-network and an upstream wireless network; and the computerized method further comprises:
   receiving at least one of: (i) one or more first data packets via the downstream peer-to-peer sub-network, or (ii) one or more second data packets via the upstream wireless network;
   establishing (i) a first service flow with a first secured data stream for data exchange between the computerized network client device and the peer-enabled computerized wireless device, and (ii) a second service flow with a second secured data stream between the computerized network client device and the service node apparatus; and
   relaying the at least one of the one or more first data packets or the one or more second data packets to at least one respective endpoint of the downstream peer-to-peer sub-network or the upstream wireless network.

6. Computer readable apparatus comprising a non-transitory storage medium, the non-transitory storage medium comprising at least one computer program having a plurality of instructions, the plurality of instructions configured to, when executed on a digital processing apparatus of a wireless network client apparatus, cause the wireless network client apparatus to:
   establish at least one logical communication channel with at least one of a service node apparatus or an access point (AP) controller apparatus;
   enable service discovery for at least one computerized wireless client device based on network data; and
   establish a peer-to-peer sub-network with one or more of the at least one computerized wireless client device;
   wherein the wireless network client apparatus is identified by the at least one of the service node apparatus or the AP controller apparatus based at least on an evaluation of a plurality of computerized wireless client devices operating as network nodes for at least one of: (i) a designated point in time, or (ii) a designated period of time.

7. The computer readable apparatus of claim 6, wherein the computer readable apparatus comprises a peer entity software application computer program disposed on the wireless network client apparatus which is configured to remain dormant until a need for augmented coverage arises.

8. The computer readable apparatus of claim 7, wherein the peer entity software application computer program is further configured to periodically wake a wireless interface of the wireless network client apparatus when the wireless network client apparatus is not active, to monitor for one or more data communications from the AP controller apparatus, the one or more data communications configured to instigate the wireless network client apparatus to act as a peer sub-network provider.

9. The computer readable apparatus of claim 6, wherein:
the plurality of instructions are further configured to, when executed on the digital processing apparatus of the wireless network client apparatus, cause the wireless network client apparatus to:
register with the at least one of the service node apparatus via the AP controller apparatus; and
the registration with the service node apparatus via the AP controller apparatus comprises registration of unique identifier associated with the wireless network client apparatus, the registration of the unique identifier configured to enable the wireless network client apparatus to operate as service access node (SAN) to computerized wireless client devices that are registered in a same network as the wireless network client apparatus.

10. The computer readable apparatus of claim 6, wherein the enablement of the service discovery for the one or more of the at least one computerized wireless client device based on the network data comprises configuration of the wireless network client apparatus to connect to a particular service node based at least on one or more predefined parameters being greater than a prescribed threshold value for establishing a new connection.

11. The computer readable apparatus of claim 6, wherein:
the plurality of instructions are further configured to, when executed on the digital processing apparatus of the wireless network client apparatus, cause the wireless network client apparatus to:
register with the at least one of the service node apparatus via the AP controller apparatus; and
the registration with the service node apparatus via the AP controller apparatus comprises data communication with one or more authentication, authorization, and accounting (AAA) servers of a managed network, the one or more AAA servers configured to provide authorization services and facilitate tracking of network subscribers for controlling access to computer resources between endpoints capable of encryption of data.

12. The computer readable apparatus of claim 6, wherein the establishment of the peer-to-peer sub-network with the one or more of the at least one computerized wireless client device comprises causation of a handoff of the one or more of the at least one computerized wireless client device from a first Internet Protocol (IP)-anchored interface of an access point apparatus to a second IP-anchored interface of the wireless network client apparatus.

13. The computer readable apparatus of claim 6, wherein the establishment of the peer-to-peer sub-network with the one or more of the at least one computerized wireless client device comprises establishment of (i) a downstream first service flow with a first secured data stream for data exchange between the wireless network client apparatus and the one or more of the at least one computerized wireless client device, and (ii) an upstream second service flow with a second secured data stream between the wireless network client apparatus and the service node apparatus.

14. The computer readable apparatus of claim 6, wherein the establishment of the peer-to-peer sub-network with the one or more of the at least one computerized wireless client device comprises, based at least on the enablement of the service discovery, cause establishment of data communication between the one or more of the at least one computerized wireless client device and the at least one of the service node apparatus or the AP controller apparatus via the peer-to-peer sub-network, such that: (i) the one or more of the at least one computerized wireless client device and the at least one of the service node apparatus or the AP controller apparatus can transact data via the wireless network client apparatus; and (ii) the wireless network client apparatus can transact data with the at least one of the service node apparatus or the AP controller apparatus in conjunction with the transaction of the data between the one or more of the at least one computerized wireless client device and the at least one of the service node apparatus or the AP controller apparatus.

15. The computer readable apparatus of claim 6, wherein the plurality of instructions are further configured to, when executed on the digital processing apparatus of the wireless network client apparatus, cause the wireless network client apparatus to:
based at least on data representative of a request for the one or more of the at least one computerized wireless client device to join or leave the peer-to-peer sub-network, cause the one or more of the at least one computerized wireless client device to be added to or removed, respectively, from the peer-to-peer sub-network.

16. Computerized client apparatus for use within a wireless network, the wireless network comprising a plurality of computerized network access points and a plurality of computerized wireless user devices, the computerized client apparatus comprising:
a wireless data interface, the wireless data interface configured for data communication with the plurality of computerized network access points;
processor apparatus in data communication with the wireless data interface; and
storage apparatus in data communication with the processor apparatus, the storage apparatus having at least one computer program stored thereon which is operative to execute on the processor apparatus, the at least one computer program comprising a plurality of instructions configured to, when executed by the processor apparatus, cause the computerized client apparatus to:
establish at least one logical communication channel with a computerized network controller apparatus via at least one computerized network access point apparatus;
receive, from the computerized network controller apparatus, data configured to enable service discovery via a peer-to-peer sub-network; and
based at least on the enablement of the service discovery, cause establishment of data communication between at least one peer-enabled computerized wireless device and the computerized network controller apparatus via the peer-to-peer sub-network, such that: (i) the at least one peer-enabled computerized wireless device and the computerized network controller apparatus can transact data via the computerized client apparatus; and (ii) the computerized client apparatus can transact data with the computerized network controller apparatus in conjunction with the transaction of the data between the at least one peer-enabled computerized wireless device and the computerized network controller apparatus;

wherein the computerized client apparatus is identified by the computerized network controller apparatus based at least on an evaluation of the plurality of computerized wireless user devices operating as network nodes for at least one of: (i) a designated point in time, or (ii) a designated period of time.

17. The computerized client apparatus of claim 16, wherein the receipt of the data configured to enable the service discovery via the peer-to-peer sub-network comprises receipt of data which enables the computerized client apparatus to advertise the computerized client apparatus as an available access point to the at least one peer-enabled computerized wireless device, the at least one peer-enabled computerized wireless device being within a wireless range of the computerized client apparatus yet which not within a wireless range of the at least one computerized network access point apparatus.

18. The computerized client apparatus of claim 16, wherein the plurality of instructions are further configured to, when executed by the processor apparatus, cause the computerized client apparatus to:

based at least on data representative of a request for the at least one peer-enabled computerized wireless device to join or leave the peer-to-peer sub-network, cause the at least one peer-enabled computerized wireless device to be added to or removed, respectively, from the peer-to-peer sub-network.

19. The computerized client apparatus of claim 16, wherein:

the computerized client apparatus is identified by the at least one peer-enabled computerized wireless device based at least on an evaluation of at least one of (i) a signal strength, (ii) a signal-to-noise ratio, or (ii) a packet error of a wireless link of the computerized client apparatus to determine that association with the computerized client apparatus would increase a then-current network reception to meet or exceed a prescribed threshold.

20. The computerized client apparatus of claim 16, wherein the computerized client apparatus acts as a host entity for the data communication between the at least one peer-enabled computerized wireless device and the at least one computerized network access point apparatus, the data communication between the at least one peer-enabled computerized wireless device and the at least one computerized network access point apparatus comprising (i) a first session between the at least one peer-enabled computerized wireless device and the computerized client apparatus; and (ii) a second session between the computerized client apparatus and the at least one computerized network access point apparatus.

* * * * *